United States Patent
Lee et al.

(10) Patent No.: US 11,751,237 B2
(45) Date of Patent: Sep. 5, 2023

(54) METHOD AND APPARATUS FOR PRIORITY HANDLING BETWEEN A PRIORITIZED MAC CE AND A SR FOR DATA IN A WIRELESS COMMUNICATION SYSTEM

(71) Applicant: LG ELECTRONICS INC., Seoul (KR)

(72) Inventors: Youngdae Lee, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/989,090

(22) Filed: Nov. 17, 2022

(65) Prior Publication Data

US 2023/0106128 A1 Apr. 6, 2023

Related U.S. Application Data

(63) Continuation of application No. PCT/KR2021/014680, filed on Oct. 20, 2021.

(30) Foreign Application Priority Data

Oct. 22, 2020 (KR) ........................ 10-2020-0137590

(51) Int. Cl.
*H04W 72/12* (2023.01)
*H04W 72/566* (2023.01)
(Continued)

(52) U.S. Cl.
CPC ..... *H04W 72/569* (2023.01); *H04W 72/1268* (2013.01); *H04W 72/21* (2023.01); *H04W 72/23* (2023.01)

(58) Field of Classification Search
CPC . H04W 72/10; H04W 72/21; H04W 72/1242; H04W 72/1247; H04W 72/1268; H04W 72/0875
See application file for complete search history.

(56) References Cited

U.S. PATENT DOCUMENTS

2021/0105058 A1* 4/2021 Lin ................. H04W 76/19
2022/0124776 A1* 4/2022 Li .................. H04W 72/1263

FOREIGN PATENT DOCUMENTS

WO 2020192748 10/2020

OTHER PUBLICATIONS

PCT International Application No. PCT/KR2021/014680, International Search Report dated Jan. 11, 2022, 2 pages.
(Continued)

*Primary Examiner* — Bo Hui A Zhu
(74) *Attorney, Agent, or Firm* — LEE, HONG, DEGERMAN, KANG & WAIMEY PC

(57) ABSTRACT

A method and apparatus for priority handling between a prioritized MAC CE and a SR for data in a wireless communication system is provided. A wireless device determines a prioritized Media Access Control (MAC) Control Element (MAC CE) which is prioritized over a data in Logical Channel Prioritization. The wireless device triggers Scheduling Request (SR) for requesting resource for the data. Based on that Physical Uplink Control Channel (PUCCH) transmission of the triggered SR is overlapped with uplink transmission of a first MAC PDU including the prioritized MAC CE, the wireless device (1) prioritizes the uplink transmission of the first MAC PDU over the PUCCH transmission of the triggered SR transmission, and (2) performs the uplink transmission of the first MAC PDU.

20 Claims, 14 Drawing Sheets

(51) Int. Cl.
*H04W 72/1268* (2023.01)
*H04W 72/21* (2023.01)
*H04W 72/23* (2023.01)

(56) References Cited

OTHER PUBLICATIONS

3rd Generation Partnership Project (3GPP), "Technical Specification Group Radio Access Network; NR; Medium Access Control (MAC) protocol specification (Release 16)," 3GPP TS 38.321 V16.2.1, Oct. 2020, 153 pages.
LG Electronics Inc., "Discussion of [AT111-e][706][V2X] Corrections for prioritization (LG for discussion and MAC CR, Vivo for RRC CR)," 3GPP TSG-RAN WG2 Meeting #111-e, online, R2-2008336, Sep. 2020, 10 pages.
LG Electronics Inc. (Rapporteur), "Report of [Post109bis-e][957][V2X]: MAC issues (LG)," 3GPP TSG-RAN WG2 #110-e, online, R2-2005720, May 2020, 99 pages.
3rd Generation Partnership Project (3GPP), "Technical Specification Group Radio Access Network; NR; NR and NG-RAN Overall Description; Stage 2 (Release 16)," 3GPP TS 38.300 V16.3.0, Oct. 2020, 145 pages.

\* cited by examiner

METHOD AND APPARATUS FOR PRIORITY HANDLING BETWEEN A PRIORITIZED MAC CE AND A SR FOR DATA IN A WIRELESS COMMUNICATION SYSTEM

CROSS-REFERENCE TO RELATED APPLICATION(S)

This application is a continuation of International Application No. PCT/KR2021/014680, filed on Oct. 20, 2021, which claims the benefit of earlier filing date and right of priority to Korean Patent Application No. 10-2020-0137590, filed on Oct. 22, 2020, the contents of all of which are hereby incorporated by reference herein in their entireties.

TECHNICAL FIELD

The present disclosure relates to a method and apparatus for priority handling between a prioritized MAC CE and a SR for data in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, logical channels shall be prioritized in accordance with a predetermined order. In this case, the MAC entity shall prioritize any MAC CE listed in a higher order than data from any Logical Channel, except data from UL-CCCH over transmission of NR sidelink communication.

SR triggered for requesting SL-SCH transmission or UL-SCH transmission can collide with UL-SCH transmission carrying at least one of the prioritized MAC CE. In this case, it is unclear how UE should transmit SR and UL-SCH.

Therefore, studies for priority handling between a prioritized MAC CE and a SR for data in a wireless communication system are required.

In an aspect, a method performed by a wireless device in a wireless communication system is provided. The wireless device determines a prioritized Media Access Control (MAC) Control Element (MAC CE) which is prioritized over a data in Logical Channel Prioritization. The wireless device triggers Scheduling Request (SR) for requesting resource for the data. Based on that Physical Uplink Control Channel (PUCCH) transmission of the triggered SR is overlapped with uplink transmission of a first MAC PDU including the prioritized MAC CE, the wireless device (1) prioritizes the uplink transmission of the first MAC PDU over the PUCCH transmission of the triggered SR transmission, and (2) performs the uplink transmission of the first MAC PDU.

In another aspect, an apparatus for implementing the above method is provided.

The present disclosure can have various advantageous effects.

According to some embodiments of the present disclosure, a wireless device could efficiently handle the priority between an Uplink-Shared Channel (UL-SCH) and a for a Scheduling Request (SR) Physical Uplink Control Channel (PUCCH).

For example, a wireless device could prevent to drop a prioritized transmission between the UL-SCH and the SR PUCCH.

In particular, a wireless device could efficiently perform priority handling between UL transmission of the MAC PDU including prioritized MAC CE and SR transmission triggered for requesting UL-SCH resource or SL-SCH resource.

According to some embodiments of the present disclosure, a wireless communication system could efficiently support the priority handling between an Uplink-Shared Channel (UL-SCH) and a for a Scheduling Request (SR) Physical Uplink Control Channel (PUCCH).

For example, a wireless communication system could efficiently support prioritized transmission for a prioritized MAC CE over a SR transmission.

For example, priority between UL transmission of the MAC PDU including prioritized MAC CE and SR transmission triggered for requesting UL-SCH resource or SL-SCH resource could be clearly determined in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
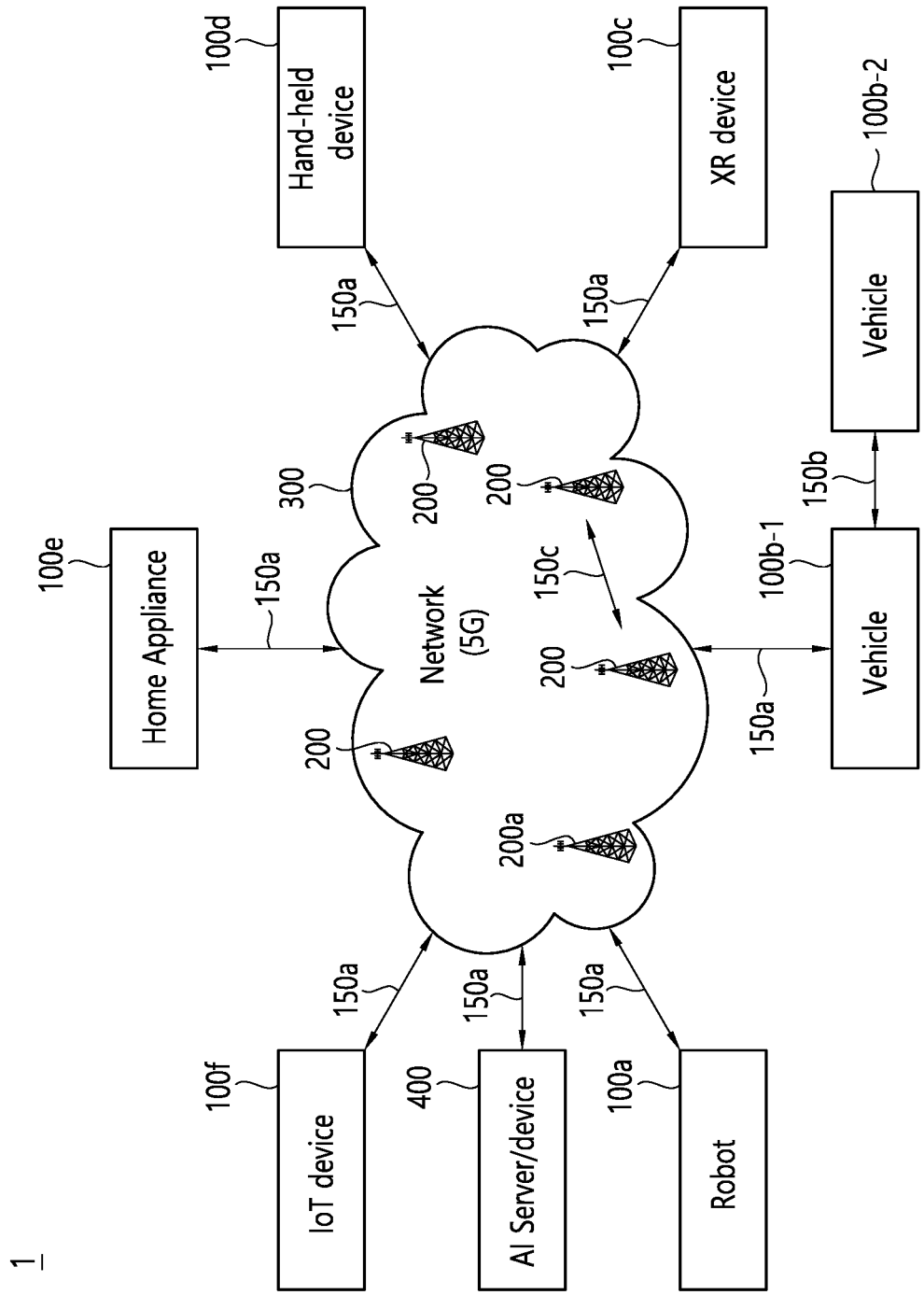
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
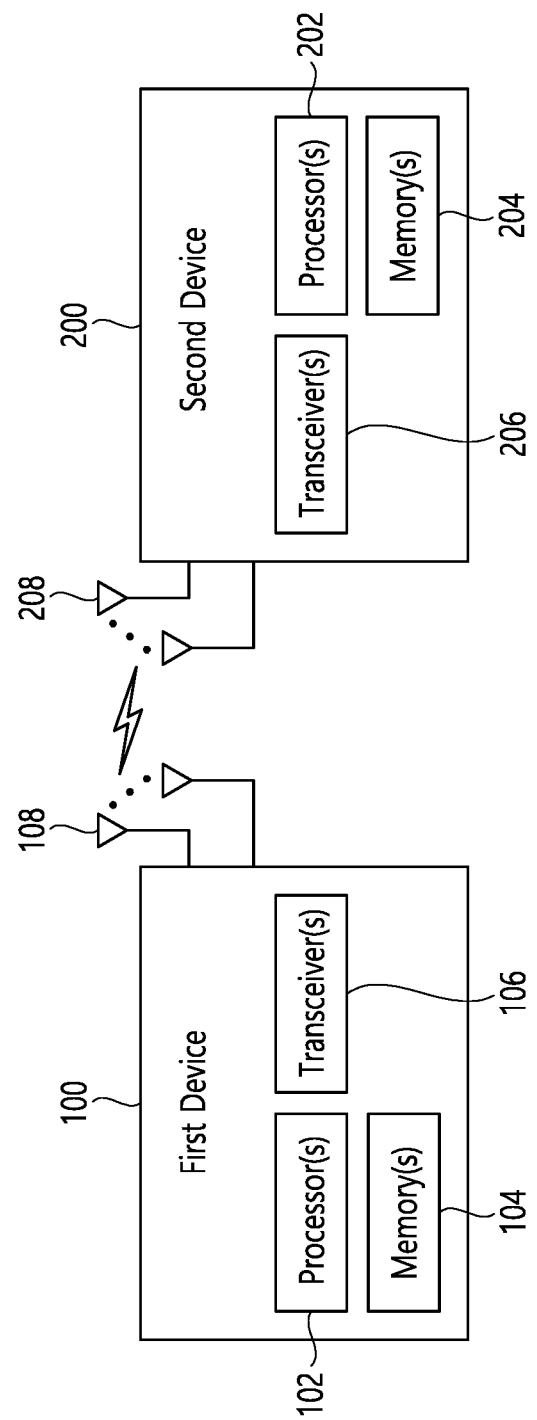
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
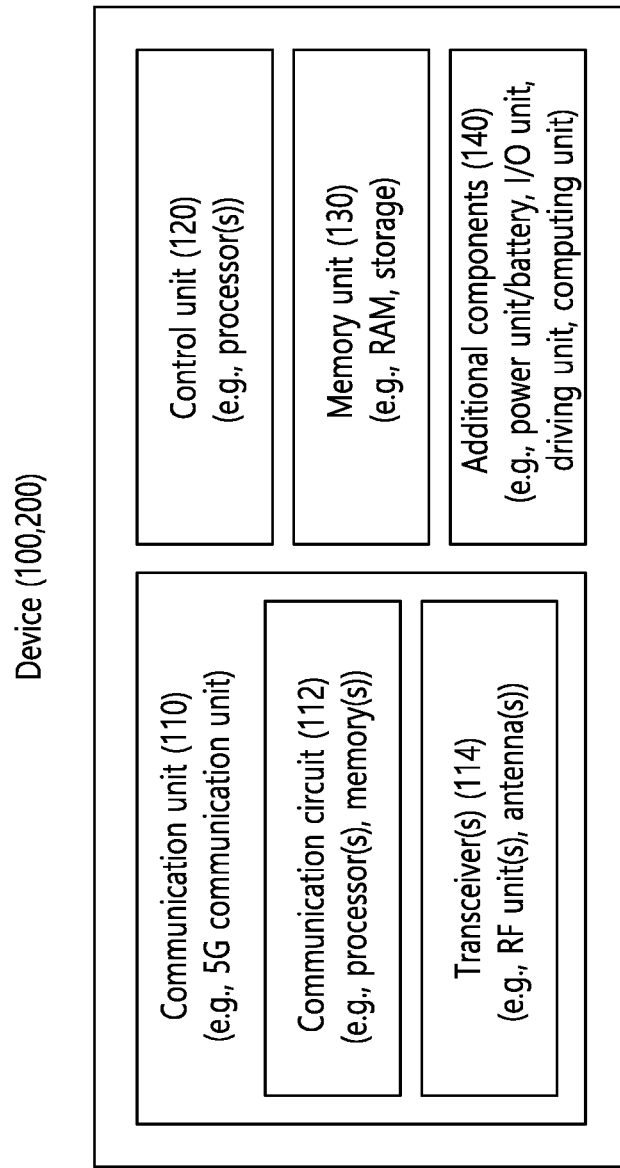
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
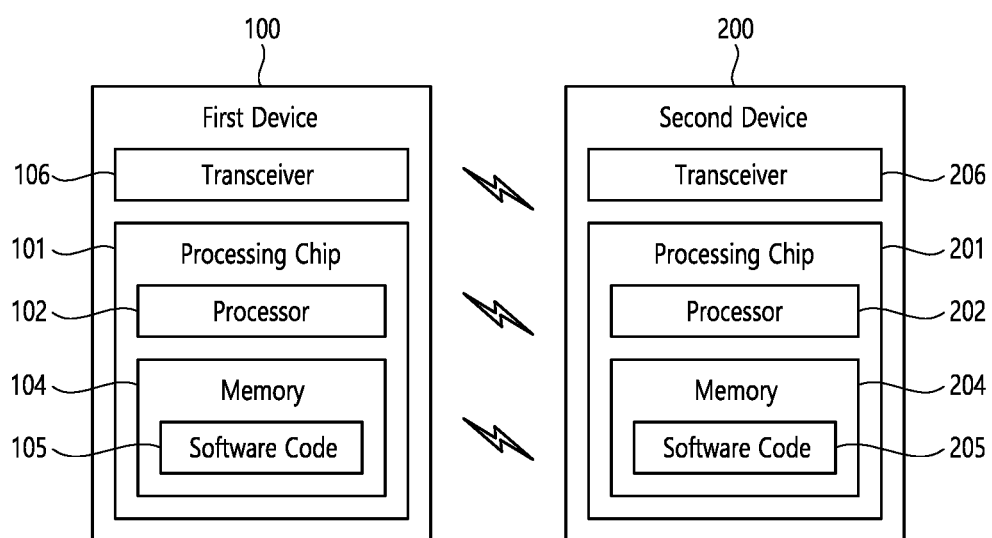
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
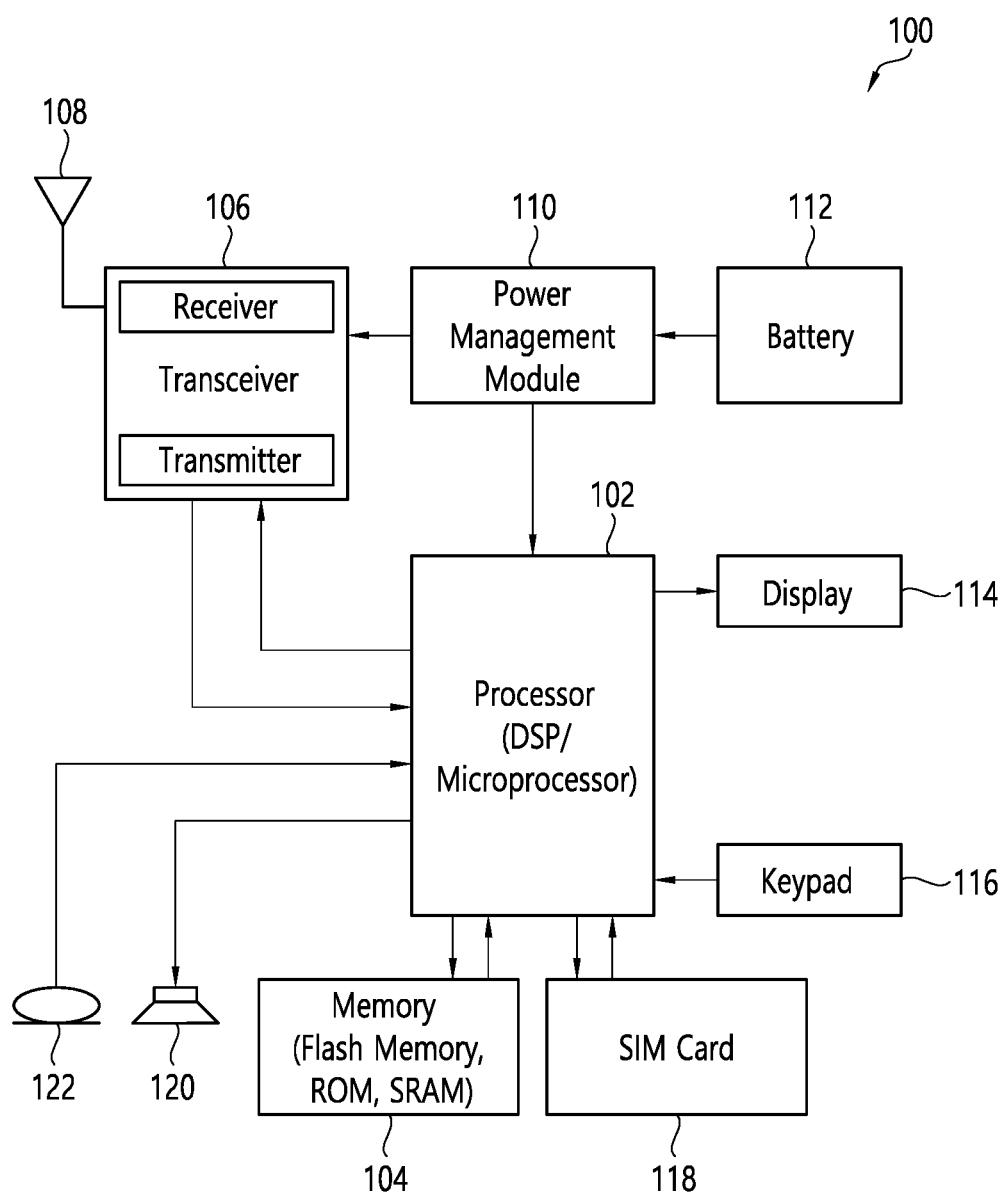
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
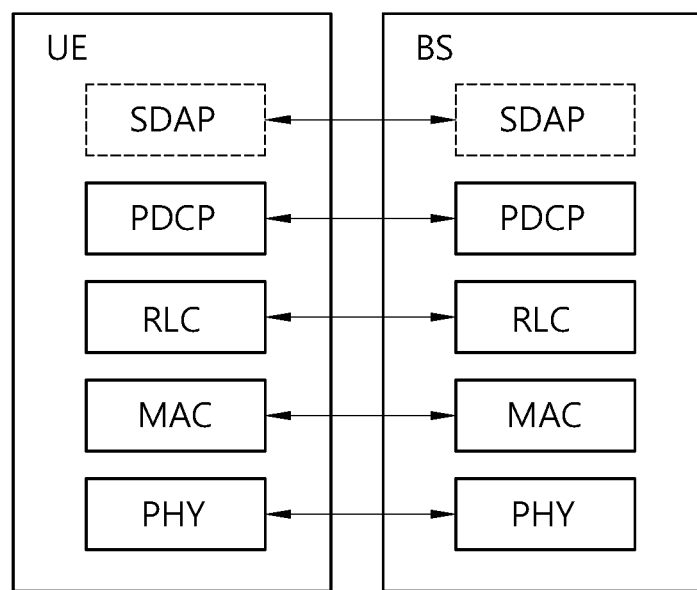
FIGS. 6 and 7 show an example of protocol stacks in a 3GPP based wireless communication system to which implementations of the present disclosure is applied.
Figure 7:
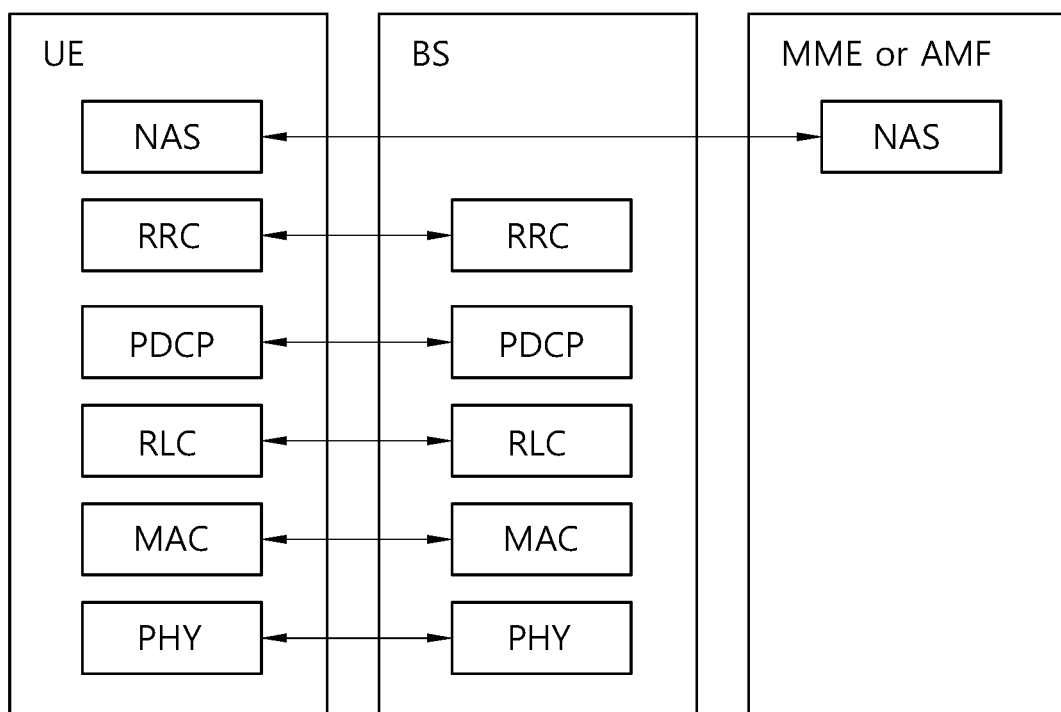

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection;

transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
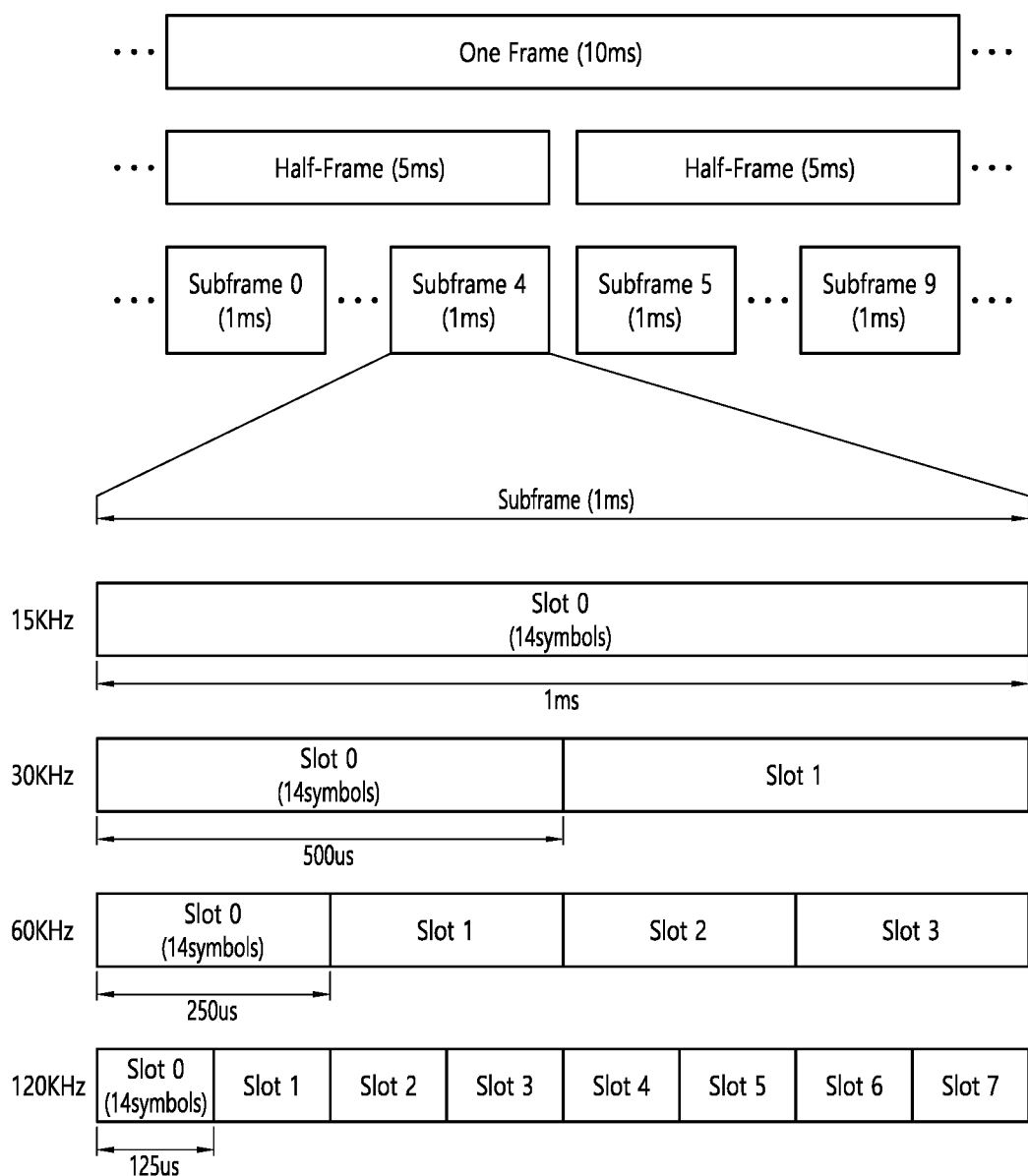
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{CRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (S Cells) can be configured to form together with the PCell a set of serving cells. An S Cell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
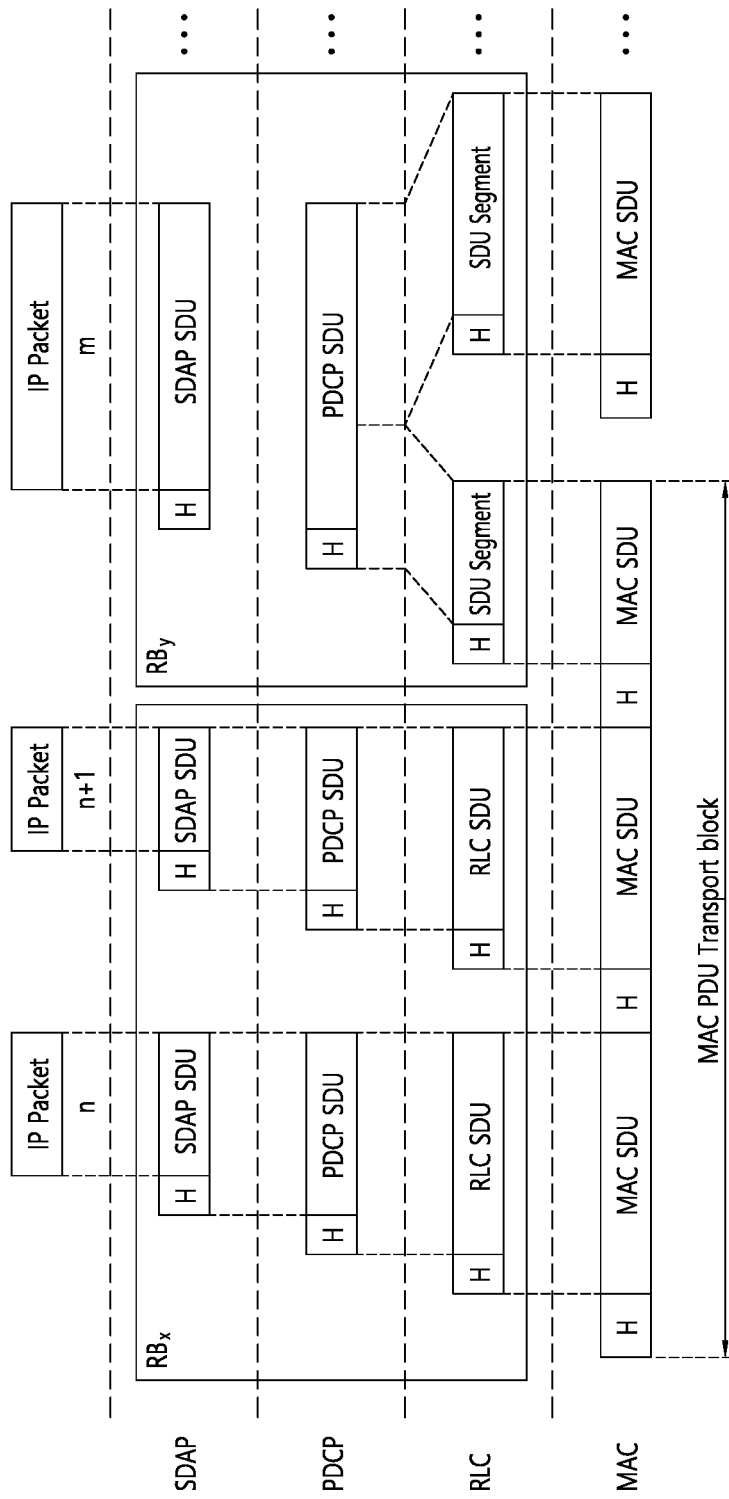
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and Random Access Channel (RACH) are mapped to their physical channels Physical Uplink Shared Channel (PUSCH) and Physical Random Access Channel (PRACH), respectively, and the downlink transport channels DL-SCH, BCH and PCH are mapped to Physical Downlink Shared Channel (PDSCH), Physical Broadcast Channel (PBCH) and PDSCH, respectively. In the PHY layer, uplink control information (UCI) is mapped to Physical Uplink Control Channel (PUCCH), and downlink control information (DCI) is mapped to Physical Downlink Control Channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

For NR, RACH can be configured either 2-step RACH or 4-step RACH. For 4-step RACH, UE transmits a RACH preamble, receives Random Access Response MAC CE, transmits a message 3 on PUSCH, and receive Contention Resolution MAC CE. For 2-step RACH, UE transmits a message A consisting of a RACH preamble and PUSCH resource, and receives a message B consisting of Random Access Response and Contention Resolution.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
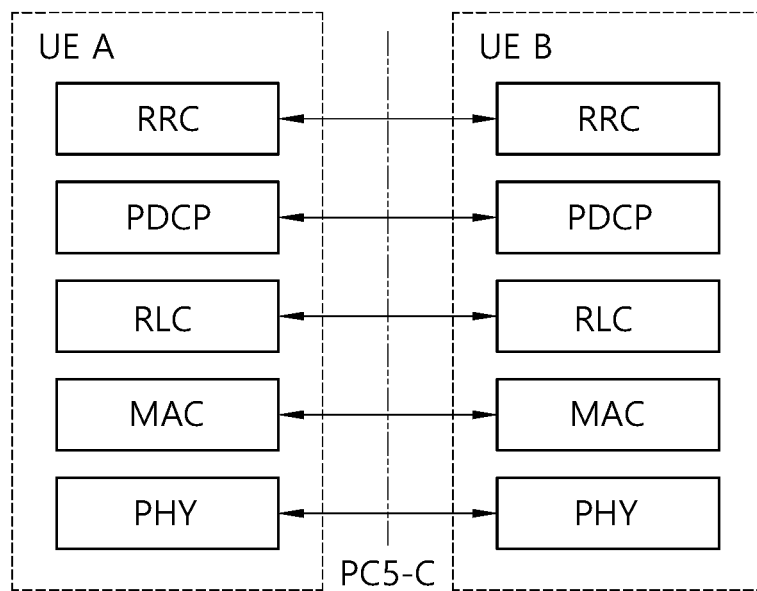
FIGS. 10 and 11 show an example of PC5 protocol stacks to which implementations of the present disclosure is applied.
Figure 11:
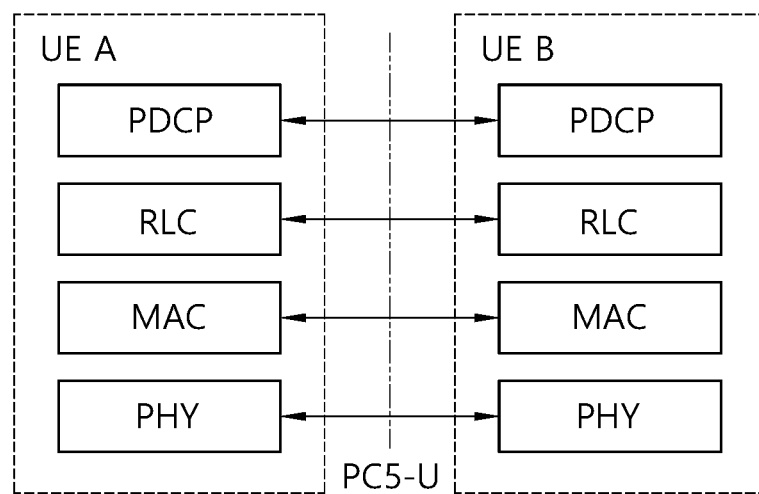

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s)
c) UE is configured with NR configured grant (Type-1 like) for SL transmission
d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, UL-SCH data transfer is described. For example, section 5.4 of 3GPP TS 38.321 v16.2.1 may be referred.

Uplink grant is either received dynamically on the PDCCH, in a Random Access Response, configured semi-persistently by RRC or determined to be associated with the PUSCH resource of MSGA. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant.

For the MAC entity configured with lch-basedPrioritization, priority of an uplink grant is determined by the highest priority among priorities of the logical channels with data available that are multiplexed or can be multiplexed in the MAC PDU, according to the mapping restrictions. The priority of an uplink grant for which no data for logical channels is multiplexed or can be multiplexed in the MAC PDU is lower than either the priority of an uplink grant for which data for any logical channels is multiplexed or can be multiplexed in the MAC PDU or the priority of the logical channel triggering an SR.

The MAC entity includes a HARQ entity for each Serving Cell with configured uplink (including the case when it is configured with supplementary Uplink), which maintains a number of parallel HARQ processes.

Each HARQ process is associated with a HARQ buffer.

New transmissions are performed on the resource and with the MCS indicated on PDCCH or indicated in the Random Access Response (i.e. MAC RAR or fallbackRAR), or signalled in RRC or determined for MSGA payload. Retransmissions are performed on the resource and, if provided, with the MCS indicated on PDCCH, or on the same resource and with the same MCS as was used for last made transmission attempt within a bundle, or on stored configured uplink grant resources and stored MCS when cg-RetransmissionTimer is configured. Retransmissions with the same HARQ process may be performed on any configured grant configuration if the configured grant configurations have the same TBS.

The Logical Channel Prioritization (LCP) procedure is applied whenever a new transmission is performed.

RRC controls the scheduling of uplink data by signalling for each logical channel per MAC entity:

priority where an increasing priority value indicates a lower priority level;

prioritisedBitRate which sets the Prioritized Bit Rate (PBR);

bucketSizeDuration which sets the Bucket Size Duration (BSD).

RRC additionally controls the LCP procedure by configuring mapping restrictions for each logical channel:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

allowedServingCells which sets the allowed cell(s) for transmission;

allowedCG-List which sets the allowed configured grant(s) for transmission;

allowedPHY-PriorityIndex which sets the allowed PHY priority index(es) of a dynamic grant for transmission.

The following UE variable is used for the Logical channel prioritization procedure:

Bj which is maintained for each logical channel j.

The MAC entity shall initialize Bj of the logical channel to zero when the logical channel is established.

For each logical channel j, the MAC entity shall:

1> increment Bj by the product PBR×T before every instance of the LCP procedure, where T is the time elapsed since Bj was last incremented;

1> if the value of Bj is greater than the bucket size (i.e. PBR×BSD):

2> set Bj to the bucket size.

The exact moment(s) when the UE updates Bj between LCP procedures is up to UE implementation, as long as Bj is up to date at the time when a grant is processed by LCP. Selection of logical channels is described.

The MAC entity shall, when a new transmission is performed:

1> select the logical channels for each UL grant that satisfy all the following conditions:

2> the set of allowed Subcarrier Spacing index values in allowedSCS-List, if configured, includes the Subcarrier Spacing index associated to the UL grant; and 2> maxPUSCH-Duration, if configured, is larger than or equal to the PUSCH transmission duration associated to the UL grant; and 2> configuredGrantType1Allowed, if configured, is set to true in case the UL grant is a Configured Grant Type 1; and 2> allowedServingCells, if configured, includes the Cell information associated to the UL grant. Does not apply to logical channels associated with a DRB configured with PDCP duplication within the same MAC entity (i.e. CA duplication) when CA duplication is deactivated for this DRB in this MAC entity; and 2> allowedCG-List, if configured, includes the configured grant index associated to the UL grant; and 2> allowedPHY-PriorityIndex, if configured, includes the priority index associated to the dynamic UL grant.

The Subcarrier Spacing index, PUSCH transmission duration, Cell information, and priority index are included in Uplink transmission information received from lower layers for the corresponding scheduled uplink transmission.

Before the successful completion of the Random Access procedure initiated for DAPS handover, the target MAC entity shall not select the logical channel(s) corresponding to non-DAPS DRB(s) for the uplink grant received in a Random Access Response or the uplink grant for the transmission of the MSGA payload.

The MAC entity shall, when a new transmission is performed:

1> allocate resources to the logical channels as follows:

2> logical channels selected for the UL grant with Bj >0 are allocated resources in a decreasing priority order. If the PBR of a logical channel is set to infinity, the MAC entity shall allocate resources for all the data that is available for transmission on the logical channel before meeting the PBR of the lower priority logical channel(s);

2> decrement Bj by the total size of MAC SDUs served to logical channel j above;

2> if any resources remain, all the logical channels selected are served in a strict decreasing priority order (regardless of the value of Bj) until either the data for that logical channel or the UL grant is exhausted, whichever comes first. Logical channels configured with equal priority should be served equally.

The value of Bj can be negative.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data;

if the MAC entity is given a UL grant size that is equal to or larger than 8 bytes while having data available and allowed for transmission, the MAC entity shall not transmit only padding BSR and/or padding.

The MAC entity shall not generate a MAC PDU for the HARQ entity if the following conditions are satisfied:

the MAC entity is configured with skip UplinkTxDynamic with value true and the grant indicated to the HARQ entity was addressed to a C-RNTI, or the grant indicated to the HARQ entity is a configured uplink grant; and there is no aperiodic CSI requested for this PUSCH transmission; and the MAC PDU includes zero MAC SDUs; and the MAC PDU includes only the periodic BSR and there is no data available for any LCG, or the MAC PDU includes only the padding BSR.

Logical channels shall be prioritised in accordance with the following order (highest priority listed first):

C-RNTI MAC CE or data from UL-CCCH;

Configured Grant Confirmation MAC CE or BFR MAC CE or Multiple Entry Configured Grant Confirmation MAC CE;

Sidelink Configured Grant Confirmation MAC CE;

LBT failure MAC CE;

MAC CE for SL-BSR prioritized according to clause 5.22.1.6;

MAC CE for BSR, with exception of BSR included for padding;

Single Entry PHR MAC CE or Multiple Entry PHR MAC CE;

MAC CE for the number of Desired Guard Symbols;

MAC CE for Pre-emptive BSR;

MAC CE for SL-BSR, with exception of SL-BSR prioritized according to clause 5.22.1.6 and SL-BSR included for padding;

data from any Logical Channel, except data from UL-CCCH;

MAC CE for Recommended bit rate query;

MAC CE for BSR included for padding;

MAC CE for SL-BSR included for padding.

Prioritization among Configured Grant Confirmation MAC CE, Multiple Entry Configured Grant Confirmation MAC CE, and BFR MAC CE is up to UE implementation.

The MAC entity shall prioritize any MAC CE listed in a higher order than 'data from any Logical Channel, except data from UL-CCCH' over transmission of NR sidelink communication.

The MAC entity shall multiplex MAC CEs and MAC SDUs in a MAC PDU.

Content of a MAC PDU does not change after being built for transmission on a dynamic uplink grant, regardless of LBT outcome.

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery and for consistent LBT failure, at most one PUCCH resource for SR is configured per BWP.

Each SR configuration corresponds to one or more logical channels and/or to SCell beam failure recovery and/or to consistent LBT failure. Each logical channel, SCell beam failure recovery, and consistent LBT failure, may be mapped to zero or one SR configuration, which is configured by RRC. The SR configuration of the logical channel that triggered a BSR or the SCell beam failure recovery or the consistent LBT failure (if such a configuration exists) is considered as corresponding SR configuration for the triggered SR. Any SR configuration may be used for an SR triggered by Pre-emptive BSR.

RRC configures the following parameters for the scheduling request procedure:

sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

Except for SCell beam failure recovery, all pending SR(s) for BSR triggered according to the BSR procedure prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR prior to the MAC PDU assembly. Except for SCell beam failure recovery, all pending SR(s) for BSR triggered according to the BSR procedure shall be cancelled and each respective sr-ProhibitTimer shall be stopped when the UL grant(s) can accommodate all pending data available for transmission. All pending SR(s) for Pre-emptive BSR triggered according to the Pre-emptive BSR procedure prior to the MAC PDU assembly shall be cancelled and each respective sr-ProhibitTimer shall be stopped when a MAC PDU containing the relevant Pre-emptive BSR MAC CE is transmitted. Pending SR triggered for beam failure recovery of an SCell shall be cancelled and respective sr-ProhibitTimer shall be stopped when the MAC PDU is transmitted and this PDU includes a BFR MAC CE or Truncated BFR MAC CE which contains beam failure recovery information of that SCell. Pending SR triggered for beam failure recovery of an SCell shall be cancelled upon deactivation of that SCell.

The MAC entity shall for each pending SR triggered by consistent LBT failure for a Serving Cell:
1> if a MAC PDU is transmitted and the MAC PDU includes an LBT failure MAC CE that indicates consistent LBT failure for the Serving Cell that triggered this SR; or
1> if all the triggered consistent LBT failure(s) for that Serving Cell that triggered this SR are cancelled:
2> cancel the pending SR and stop the corresponding sr-ProhibitTimer, if running.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
2> initiate a Random Access procedure on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap:
3> if the PUCCH resource for the SR transmission occasion overlaps with neither a UL-SCH resource nor an SL-SCH resource; or
3> if the MAC entity is able to perform this SR transmission simultaneously with the transmission of the SL-SCH resource; or
3> if the MAC entity is configured with lch-basedPrioritization, and the PUCCH resource for the SR transmission occasion does not overlap with an uplink grant received in a Random Access Response nor with the PUSCH duration of a MSGA payload, and the PUCCH resource for the SR transmission occasion for the pending SR triggered overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized, and the priority of the uplink grant is determined; or
3> if both sl-Prioritizationthres and ul-Prioritizationthres are configured and the PUCCH resource for the SR transmission occasion for the pending SR triggered overlaps with any UL-SCH resource(s) carrying a MAC PDU, and the priority of the triggered SR determined is lower than sl-Prioritizationthres and the value of the highest priority of the logical channel(s) in the MAC PDU is higher than or equal to ul-Prioritizationthres and the MAC PDU is not prioritized by upper layer; or
3> if a SL-SCH resource overlaps with the PUCCH resource for the SR transmission occasion for the pending SR triggered, and the MAC entity is not able to perform this SR transmission simultaneously with the transmission of the SL-SCH resource, and either transmission on the SL-SCH resource is not prioritized or the priority value of the logical channel that triggered SR is lower than ul-Prioritizationthres, if configured; or
3> if a SL-SCH resource overlaps with the PUCCH resource for the SR transmission occasion for the pending SR triggered, and the MAC entity is not able to perform this SR transmission simultaneously with the transmission of the SL-SCH resource, and the priority of the triggered SR determined is higher than the priority of the MAC PDU determined for the SL-SCH resource:
4> consider the SR transmission as a prioritized SR transmission.
4> consider the other overlapping uplink grant(s), if any, as a de-prioritized uplink grant(s);
4> if SR_COUNTER<sr-TransMax:
5> instruct the physical layer to signal the SR on one valid PUCCH resource for SR;
5> if LBT failure indication is not received from lower layers:
6> increment SR_COUNTER by 1;
6> start the sr-ProhibitTimer.
5> else if lbt-FailureRecoveryConfig is not configured:
6> increment SR_COUNTER by 1.
4> else:
5> notify RRC to release PUCCH for all Serving Cells;
5> notify RRC to release SRS for all Serving Cells;
5> clear any configured downlink assignments and uplink grants;
5> clear any PUSCH resources for semi-persistent CSI reporting;
5> initiate a Random Access procedure (see clause 5.1) on the SpCell and cancel all pending SRs.
3> else:
4> consider the SR transmission as a de-prioritized SR transmission.

Except for SR for SCell beam failure recovery, the selection of which valid PUCCH resource for SR to signal SR on when the MAC entity has more than one overlapping valid PUCCH resource for the SR transmission occasion is left to UE implementation.

If more than one individual SR triggers an instruction from the MAC entity to the PHY layer to signal the SR on the same valid PUCCH resource, the SR_COUNTER for the relevant SR configuration is incremented only once.

When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

For a UE operating in a semi-static channel access mode, PUCCH resources overlapping with the idle time of a fixed frame period are not considered valid.

The MAC entity may stop, if any, ongoing Random Access procedure due to a pending SR for BSR and BFR which has no valid PUCCH resources configured, which was initiated by MAC entity prior to the MAC PDU assembly. The ongoing Random Access procedure due to a pending SR for BSR may be stopped when the MAC PDU is transmitted using a UL grant other than a UL grant provided by Random Access Response or a UL grant determined for the transmission of the MSGA payload, and this PDU includes a BSR MAC CE which contains buffer status up to (and including) the last event that triggered a BSR prior to the MAC PDU assembly, or when the UL grant(s) can accommodate all pending data available for transmission. The ongoing Random Access procedure due to a pending SR for BFR of an SCell may be stopped when the MAC PDU is transmitted using a UL grant other than a UL grant provided by Random Access Response or a UL grant determined for the transmission of the MSGA payload and this PDU contains a BFR MAC CE or Truncated BFR MAC CE which includes beam failure recovery information of that SCell. Upon deactivation of SCell configured with beam failure detection the ongoing Random Access procedure due to a pending SR for BFR may be stopped if all triggered BFRs for SCells are cancelled.

The MAC entity may stop, if any, ongoing Random Access procedure due to a pending SR for consistent LBT failure, which has no valid PUCCH resources configured, if:
  all the SCells that triggered consistent LBT failure are deactivated; or
  a MAC PDU is transmitted using a UL grant other than a UL grant provided by Random Access Response or a UL grant determined for the transmission of the MSGA payload, and this PDU includes an LBT failure MAC CE that indicates consistent LBT failure for all the SCells that triggered consistent LBT failure.

SL-SCH Data transfer is described. Section 5.22 of 3GPP TS 38.321 v16.2.1 may be referred.

Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

The Sidelink process is associated with a HARQ buffer.

New transmissions and retransmissions are performed on the resource indicated in the sidelink grant and with the MCS selected.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

The sidelink Logical Channel Prioritization procedure is applied whenever a new transmission is performed.

RRC controls the scheduling of sidelink data by signalling for each logical channel:
  sl Priority where an increasing priority value indicates a lower priority level;
  sl-PrioritisedBitRate which sets the sidelink Prioritized Bit Rate (sPBR);
  sl-BucketSizeDuration which sets the sidelink Bucket Size Duration (sBSD).

RRC additionally controls the LCP procedure by configuring mapping restrictions for each logical channel:
  sl-configuredGrantType1Allowed which sets whether a configured grant Type 1 can be used for sidelink transmission;
  sl-AllowedCG-List which sets the allowed configured grant(s) for sidelink transmission;
  sl-HARQ-FeedbackEnabled which sets whether the logical channel is allowed to be multiplexed with logical channel(s) with sl-HARQ-FeedbackEnabled set to enabled or disabled.

The following UE variable is used for the Logical channel prioritization procedure:
  SBj which is maintained for each logical channel j.

The MAC entity shall initialize SBj of the logical channel to zero when the logical channel is established.

For each logical channel j, the MAC entity shall:
  1> increment SBj by the product sPBR×T before every instance of the LCP procedure, where T is the time elapsed since SBj was last incremented;
  1> if the value of SBj is greater than the sidelink bucket size (i.e. sPBR×sBSD):
    2> set SBj to the sidelink bucket size.

The exact moment(s) when the UE updates SBj between LCP procedures is up to UE implementation, as long as SBj is up to date at the time when a grant is processed by LCP.

The MAC entity shall multiplex MAC SDUs in a MAC PDU.

In addition, the Scheduling Request (SR) is also used for requesting SL-SCH resources for new transmission when triggered by the Sidelink BSR or the SL-CSI reporting. If configured, the MAC entity performs the SR procedure.

The SR configuration of the logical channel that triggered the Sidelink BSR (if such a configuration exists) is also considered as corresponding SR configuration for the triggered SR. The priority of the triggered SR corresponds to the priority of the logical channel.

If the SL-CSI reporting procedure is enabled by RRC, the SL-CSI reporting is mapped to one SR configuration for all PC5-RRC connections established by RRC. The SR configuration of the SL-CSI reporting is considered as corresponding SR configuration for the triggered SR. The priority of the triggered SR corresponds to the priority of the SL-CSI reporting.

All pending SR(s) triggered according to the Sidelink BSR procedure prior to the MAC PDU assembly shall be cancelled and each respective sr-ProhibitTimer shall be stopped when the MAC PDU is transmitted and this PDU includes a SL-BSR MAC CE which contains buffer status up to (and including) the last event that triggered a Sidelink BSR prior to the MAC PDU assembly.

All pending SR(s) triggered according to the Sidelink BSR procedure shall be cancelled and each respective sr-ProhibitTimer shall be stopped when the SL grant(s) can accommodate all pending data available for transmission in sidelink.

The pending SR triggered according to the SL-CSI reporting for a destination shall be cancelled and each respective sr-ProhibitTimer shall be stopped when the SL grant(s) can accommodate the SL-CSI reporting that has been triggered but not cancelled or when the triggered SL-CSI reporting is cancelled due to latency non-fulfilment. All pending SR(s) triggered by either Sidelink BSR or Sidelink CSI report shall be cancelled, when RRC configures Sidelink resource allocation mode 2.

Technical features related to Buffer Status Reporting are described. Section 5.22.1.6 of 3GPP TS 38.321 v16.2.1 may be referred.

The Sidelink Buffer Status reporting (SL-BSR) procedure is used to provide the serving gNB with information about SL data volume in the MAC entity.

RRC configures the following parameters to control the SL-BSR:
- sl-periodicBSR-Timer, configured by periodicBSR-Timer in sl-BSR-Config;
- sl-retxBSR-Timer, configured by retxBSR-Timer in sl-BSR-Config;
- sl-logicalChannelSR-DelayTimerApplied;
- sl-logicalChannelSR-DelayTimer, configured by logicalChannelSR-DelayTimer in sl-BSR-Config;
- sl-logicalChannelGroup.

Each logical channel which belongs to a Destination is allocated to an LCG. The maximum number of LCGs is eight.

The MAC entity determines the amount of SL data available for a logical channel according to the data volume calculation procedure.

A SL-BSR shall be triggered if any of the following events occur:
1> if the MAC entity has been configured with Sidelink resource allocation mode 1:
2> SL data, for a logical channel of a Destination, becomes available to the MAC entity; and either
3> this SL data belongs to a logical channel with higher priority than the priorities of the logical channels containing available SL data which belong to any LCG belonging to the same Destination; or
3> none of the logical channels which belong to an LCG belonging to the same Destination contains any available SL data.
in which case the SL-BSR is referred below to as 'Regular SL-BSR';
2> UL resources are allocated and number of padding bits remaining after a Padding BSR has been triggered is equal to or larger than the size of the SL-BSR MAC CE plus its subheader, in which case the SL-BSR is referred below to as 'Padding SL-BSR';
2> sl-retxBSR-Timer expires, and at least one of the logical channels which belong to an LCG contains SL data, in which case the SL-BSR is referred below to as 'Regular SL-BSR';
2> sl-periodicBSR-Timer expires, in which case the SL-BSR is referred below to as 'Periodic SL-BSR'.
1> else:
2> Sidelink resource allocation mode 1 is configured by RRC and SL data is available for transmission in the RLC entity or in the PDCP entity, in which case the Sidelink BSR is referred below to as "Regular SL-BSR".

For Regular SL-BSR, the MAC entity shall:
1> if the SL-BSR is triggered for a logical channel for which sl-logicalChannelSR-DelayTimerApplied with value true is configured by RRC:
2> start or restart the sl-logicalChannelSR-DelayTimer.
1> else:
2> if running, stop the sl-logicalChannelSR-DelayTimer.

For Regular and Periodic SL-BSR, the MAC entity shall:
1> if sl-PrioritizationThres is configured and the value of the highest priority of the logical channels that belong to any LCG and contain SL data for any Destination is lower than sl-PrioritizationThres; and
1> if either ul-PrioritizationThres is not configured or ul-PrioritizationThres is configured and the value of the highest priority of the logical channels that belong to any LCG and contain UL data is equal to or higher than ul-PrioritizationThres:
2> prioritize the LCG(s) for the Destination(s).
1> if the Buffer Status reporting procedure determines that at least one BSR has been triggered and not cancelled and the UL grant cannot accommodate a SL-BSR MAC CE containing buffer status only for all prioritized LCGs having data available for transmission plus the subheader of the SL-BSR, in case the SL-BSR is considered as not prioritized:
2> prioritize the SL-BSR for logical channel prioritization;
2> report Truncated SL-BSR containing buffer status for as many prioritized LCGs having data available for transmission as possible, taking the number of bits in the UL grant into consideration.
1> else if the number of bits in the UL grant is expected to be equal to or larger than the size of a SL-BSR containing buffer status for all LCGs having data available for transmission plus the subheader of the SL-BSR:
2> report SL-BSR containing buffer status for all LCGs having data available for transmission.
1> else:
2> report Truncated SL-BSR containing buffer status for as many LCGs having data available for transmission as possible, taking the number of bits in the UL grant into consideration.

For Padding BSR:
1> if the number of padding bits remaining after a Padding BSR has been triggered is equal to or larger than the size of a SL-BSR containing buffer status for all LCGs having data available for transmission plus its subheader:
2> report SL-BSR containing buffer status for all LCGs having data available for transmission;
1> else:
2> report Truncated SL-BSR containing buffer status for as many LCGs having data available for transmission as possible, taking the number of bits in the UL grant into consideration.

For SL-BSR triggered by sl-retxBSR-Timer expiry, the MAC entity considers that the logical channel that triggered the SL-BSR is the highest priority logical channel that has data available for transmission at the time the SL-BSR is triggered.

The MAC entity shall:
1> if the sidelink Buffer Status reporting procedure determines that at least one SL-BSR has been triggered and not cancelled:
2> if UL-SCH resources are available for a new transmission and the UL-SCH resources can accommodate the SL-BSR MAC CE plus its subheader as a result of logical channel prioritization:
3> instruct the Multiplexing and Assembly procedure to generate the SL-BSR MAC CE(s);
3> start or restart sl-periodicBSR-Timer except when all the generated SL-BSRs are Truncated SL-BSRs;
3> start or restart sl-retxBSR-Timer.

2> if a Regular SL-BSR has been triggered and sl-logicalChannelSR-DelayTimer is not running:
3> if there is no UL-SCH resource available for a new transmission; or
3> if UL-SCH resources are available for a new transmission and the UL-SCH resources cannot accommodate the SL-BSR MAC CE plus its subheader as a result of logical channel prioritization; or
3> if the set of Subcarrier Spacing index values in sl-AllowedSCS-List, if configured for the logical channel that triggered the SL-BSR, does not include the Subcarrier Spacing index associated to the UL-SCH resources available for a new transmission; or
3> if sl-MaxPUSCH-Duration, if configured for the logical channel that triggered the SL-BSR, is smaller than the PUSCH transmission duration associated to the UL-SCH resources available for a new transmission:
4> trigger a Scheduling Request.

UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one SL-BSR MAC CE, even when multiple events have triggered a SL-BSR. The Regular SL-BSR and the Periodic SL-BSR shall have precedence over the padding SL-BSR.

The MAC entity shall restart sl-retxBSR-Timer upon reception of an SL grant for transmission of new data on any SL-SCH.

All triggered SL-BSRs may be cancelled when the SL grant(s) can accommodate all pending data available for transmission. All BSRs triggered prior to MAC PDU assembly shall be cancelled when a MAC PDU is transmitted and this PDU includes a SL-BSR MAC CE which contains buffer status up to (and including) the last event that triggered a SL-BSR prior to the MAC PDU assembly. All triggered SL-BSRs shall be cancelled, and sl-retx-BSR-Timer and sl-periodic-BSR-Timer shall be stopped, when RRC configures Sidelink resource allocation mode 2.

MAC PDU assembly can happen at any point in time between uplink grant reception and actual transmission of the corresponding MAC PDU. SL-BSR and SR can be triggered after the assembly of a MAC PDU which contains a SL-BSR MAC CE, but before the transmission of this MAC PDU. In addition, SL-BSR and SR can be triggered during MAC PDU assembly.

Meanwhile, as described above, logical channels may be prioritised in accordance with the following order (highest priority listed first):

C-RNTI MAC CE or data from UL-CCCH;
Configured Grant Confirmation MAC CE or BFR MAC CE or Multiple Entry Configured Grant Confirmation MAC CE;
Sidelink Configured Grant Confirmation MAC CE;
LBT failure MAC CE;
MAC CE for SL-BSR prioritized according to the technical features related to Buffer Status Reporting, which are described above with reference to section 5.22.1.6 of 3GPP TS 38.321 v16.2.1;
MAC CE for BSR, with exception of BSR included for padding;
Single Entry PHR MAC CE or Multiple Entry PHR MAC CE;
MAC CE for the number of Desired Guard Symbols;
MAC CE for Pre-emptive BSR;
MAC CE for SL-BSR, with exception of (i) SL-BSR prioritized according to the technical features related to Buffer Status Reporting, which are described above with reference to section 5.22.1.6 of 3GPP TS 38.321 v16.2.1 and (ii) SL-BSR included for padding;
data from any Logical Channel, except data from UL-CCCH;
MAC CE for Recommended bit rate query;
MAC CE for BSR included for padding;
MAC CE for SL-BSR included for padding.

In this case, the MAC entity may prioritize any MAC CE listed in a higher order than 'data from any Logical Channel, except data from UL-CCCH' over transmission of NR sidelink communication.

SR triggered for requesting SL-SCH transmission or UL-SCH transmission could collide with UL-SCH transmission carrying at least one of the prioritized MAC CE listed in the higher order. In this case, it is unclear how UE should transmit SR and UL-SCH.

Therefore, studies for priority handling between a prioritized MAC CE and a SR for data in a wireless communication system are required.

Hereinafter, a method for priority handling between a prioritized MAC CE and a SR for data in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
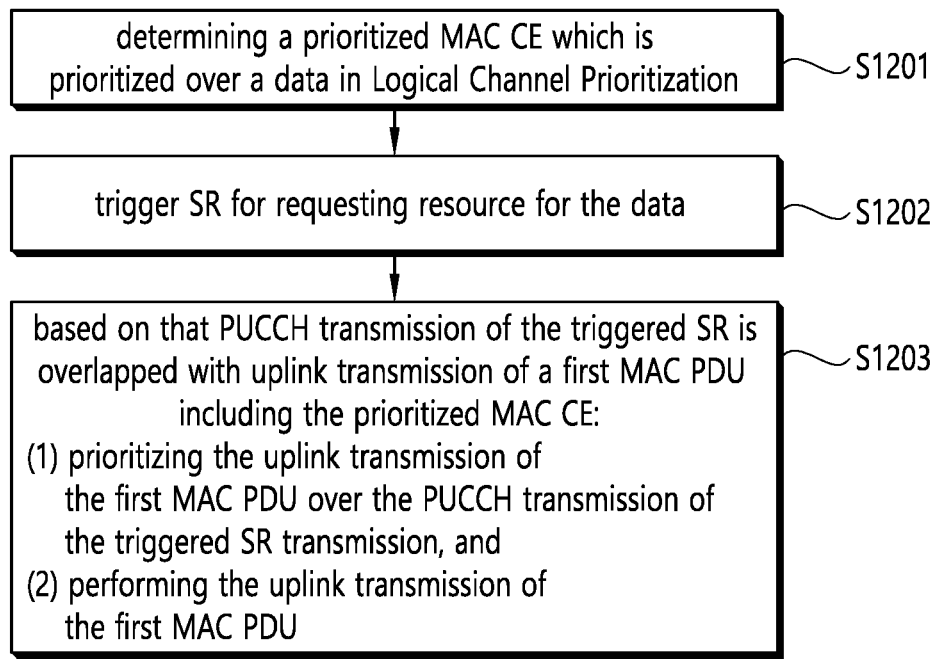
FIG. 12 shows an example of a method for priority handling between a prioritized MAC CE and a SR for data in a wireless communication system, according to some embodiments of the present disclosure.

FIG. 12 shows an example of a method for priority handling between a prioritized MAC CE and a SR for data in a wireless communication system, according to some embodiments of the present disclosure.

In particular, FIG. 12 shows an example of a method performed by a wireless device in a wireless communication system.

In step S1201, a wireless device may determine a prioritized Media Access Control (MAC) Control Element (MAC CE) which is prioritized over a data in Logical Channel Prioritization.

For example, the prioritized MAC CE may include at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

For example, wherein the data may be a sidelink (SL) data.

For example, the data may be from a logical channel except uplink-Common Control Channel (UL-CCCH).

In step S1202, a wireless device may trigger Scheduling Request (SR) for requesting resource for the data.

For example, the requesting resource for the data may be either an uplink (UL) resource or a sidelink resource.

In step S1203, based on that Physical Uplink Control Channel (PUCCH) transmission of the triggered SR is overlapped with uplink transmission of a first MAC PDU including the prioritized MAC CE, a wireless device may prioritize the uplink transmission of the first MAC PDU over the PUCCH transmission of the triggered SR transmission, and perform the uplink transmission of the first MAC PDU.

For example, based on that PUCCH transmission of the triggered SR is overlapped with uplink transmission of a MAC PDU including the prioritized MAC CE, a wireless device may drop the PUCCH transmission of the triggered SR transmission.

According to some embodiments of the present disclosure, a wireless device may determine a non-prioritized MAC CE. The data may be prioritized over the non-prioritized MAC CE.

Based on that PUCCH transmission of the triggered SR is overlapped with uplink transmission of a second MAC PDU including the non-prioritized MAC CE, a wireless device may prioritize the PUCCH transmission of the triggered SR transmission over the uplink transmission of the second MAC PDU, and perform the PUCCH transmission of the triggered SR transmission.

For example, the non-prioritized MAC CE may include at least one of (1) MAC CE for Recommended bit rate query, (2) MAC CE for BSR included for padding, and (3) MAC CE for SL-BSR included for padding.

In this case, a wireless device triggering a random access procedure.

Based on that PUCCH transmission of the triggered SR is overlapped with an uplink resource for the random access procedure, a wireless device may prioritize the uplink resource for the random access procedure over the PUCCH transmission of the triggered SR transmission, perform the random access procedure using the uplink resource.

For example, the uplink resource for the random access procedure may include an uplink grant included in an Access Response message for the random access procedure.

For other example, the uplink resource for the random access procedure may include a Physical Uplink Shared Channel (PUSCH) duration of a MSGA payload.

According to some embodiments of the present disclosure, the wireless device may be in communication with at least one of a user equipment, a network, or an autonomous vehicle other than the wireless device.

Hereinafter, a method for priority handling between a prioritized MAC CE and a SR transmission according to some embodiments of the present disclosure will be described with reference to FIGS. 13 and 14.

For example, the method for performing data transmission by a UE includes the following steps:

For an uplink transmission, UE may construct a MAC Control Element (MAC CE) which is prioritized over any UL data in Logical Channel Prioritization. Herein, the UL data may be transmitted over DCCH or DTCH, not CCCH.

UE may trigger SR for requesting either uplink resource or sidelink resource.

If PUCCH resource of the triggered SR is overlapped with the uplink transmission of a MAC PDU including the MAC CE, UE may prioritize the uplink transmission over the SR transmission.

UE may drop the SR transmission and performs the uplink transmission of the MAC PDU.

Figure 13:
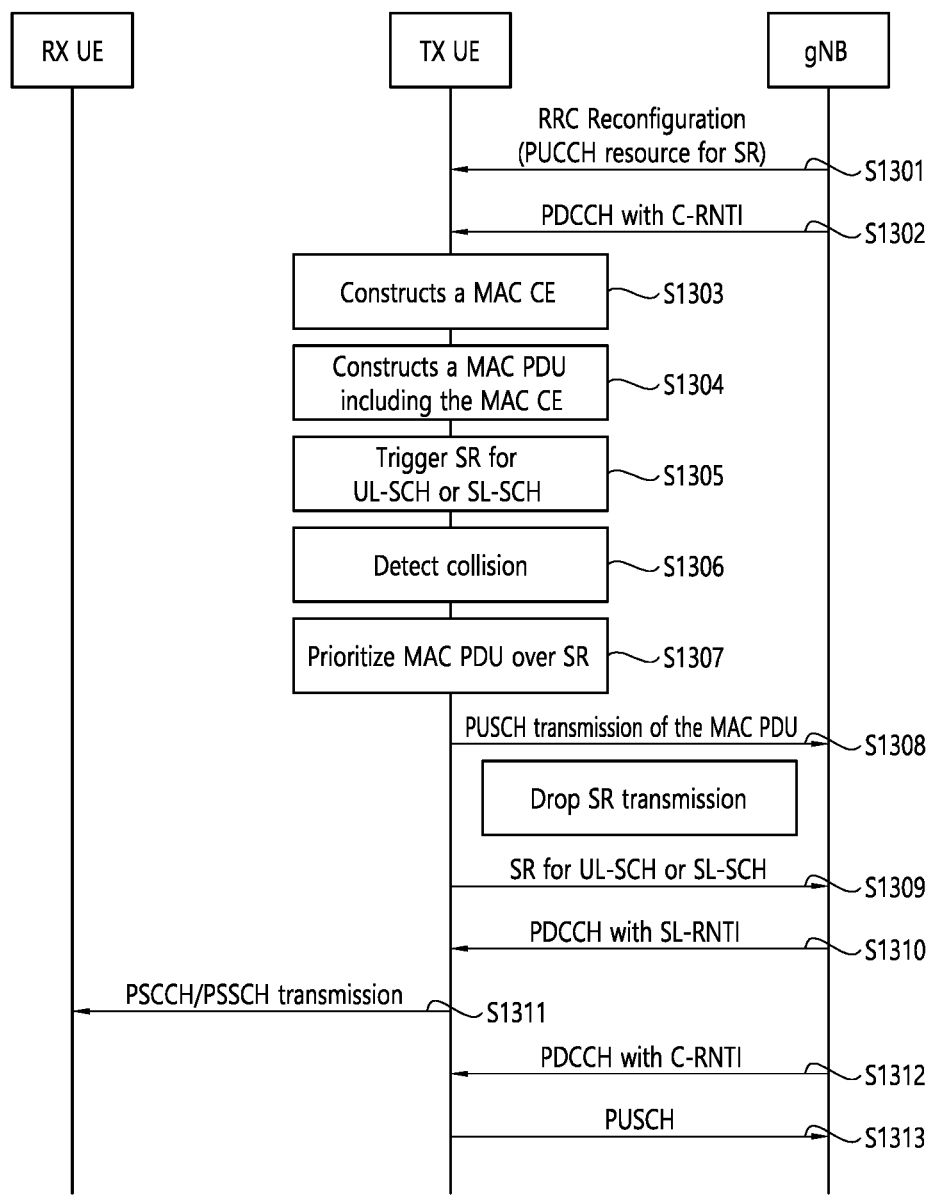
FIG. 13 shows an example of prioritization of prioritized MAC CE over SR transmission according to some embodiments of the present disclosure.

FIG. 13 shows an example of prioritization of prioritized MAC CE over SR transmission according to some embodiments of the present disclosure.

In step S1301, a gNB may transmit, to a TX UE, an RRC reconfiguration. The RRC reconfiguration may include a PUCCH resources for SR.

In step S1302, the TX UE may monitor PDCCH with a Cell-Radio Network Temporary Identifier (C-RNTI).

In step S1303, the TX UE may construct a MAC CE.

In step S1304, the TX UE may constructs a MAC PDU including the MAC CE.

In step S1305, the TX UE may trigger SR for UL-SCH or SL-SCH transmission.

In step S1306, the TX UE may detect collision between the constructed MAC PDU in step S1304 and the triggered SR in step S1305.

In step S1307, the TX UE may prioritize the constructed MAC PDU over the triggered SR.

In step S1308, the TX UE may perform PUSCCH transmission of the MAC PDU to the gNB. In this step, the TX UE may drop the SR transmission.

In step S1309, the TX UE may transmit, to the gNB, the SR for UL-SCH or SL-SCH.

In step S1310, the TX UE may monitoring PDCCH with a SL-RNTI. For example, the TX UE may receive a SL-grant from the gNB.

In step S1311, the TX UE may perform PSCCH and/or PSSCH transmission to a RX UE. For example, the TX UE may perform the PSCCH and/or PSSCH transmission based on the received SL-grant in step S1310.

In step S1312, the TX UE may monitor PDCCH with a C-RNTI. For example, the TX UE may receive an UL-grant from the gNB.

In step S1313, the TX UE may perform PUSCH transmission to the gNB. For example, the TX UE may perform the PUSCH transmission based on the received UL-grant in step S1312.

Figure 14:
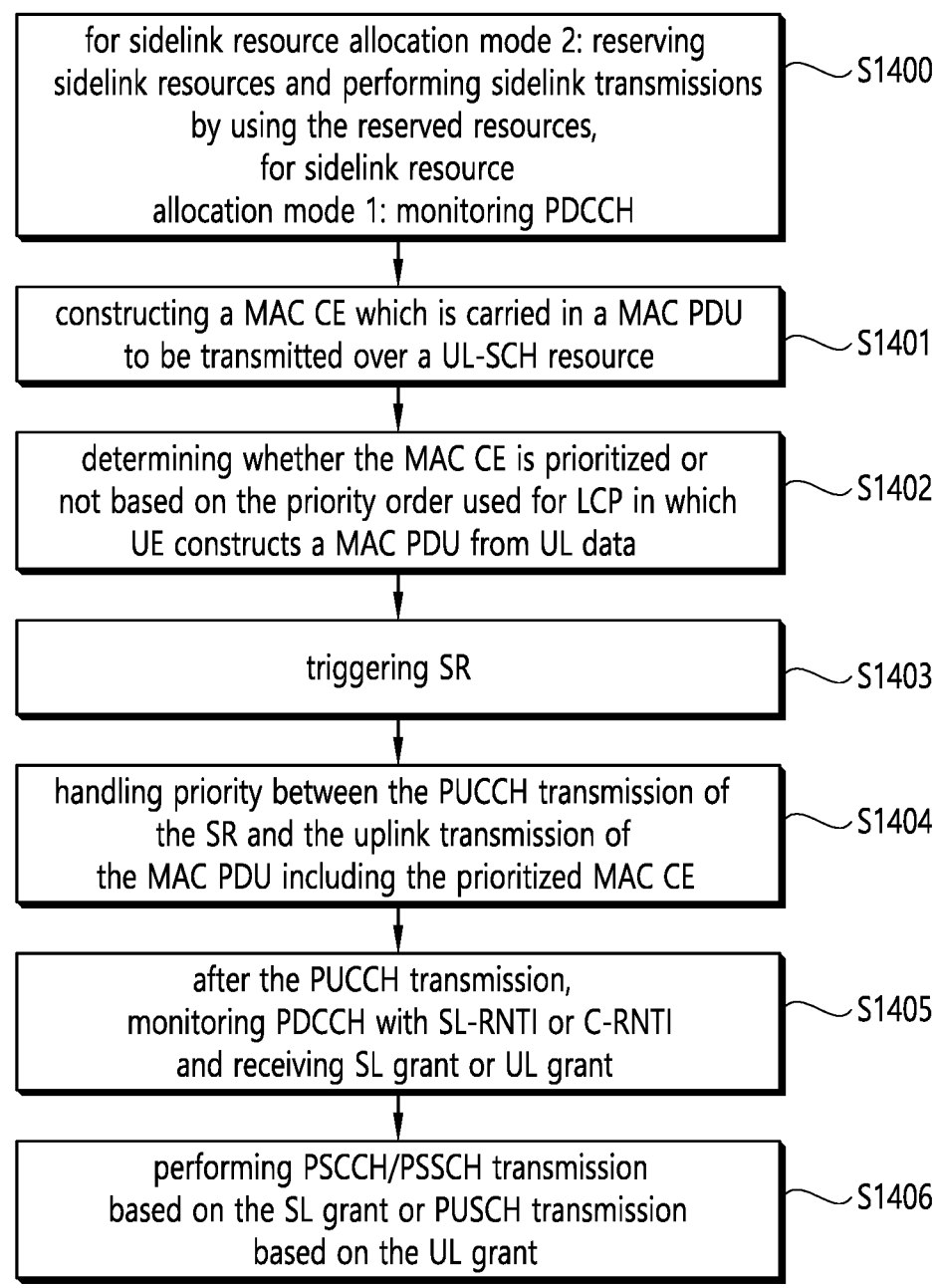
FIG. 14 shows an example of a method for priority handling between a prioritized MAC CE and a SR transmission in a wireless communication system, according to some embodiments of the present disclosure.

FIG. 14 shows an example of a method for priority handling between a prioritized MAC CE and a SR transmission in a wireless communication system, according to some embodiments of the present disclosure.

In step S1400, for sidelink resource allocation mode 2, UE may reserve sidelink resources and perform sidelink transmissions by using the reserved resources. For sidelink resource allocation mode 1, UE may monitor PDCCH. If DCI of which CRC is scrambled by SL-RNTI or SLCS-RNTI is received on PDCCH, UE may allocate sidelink resources according to the DCI (Downlink Control Information). Then, UE may perform sidelink transmissions by using the received resources.

In step S1401, UE may construct a MAC CE which is carried in a MAC PDU to be transmitted over a UL-SCH resource.

In step S1402, UE may determine whether the MAC CE is prioritized or not based on the priority order used for Logical Channel prioritization (LCP) in which UE constructs a MAC PDU from UL data. If the MAC CE is listed in a higher order than 'data from any Logical Channel, except data from UL-CCCH', the UE prioritizes the MAC CE over transmission of NR sidelink communication.

The priority order used for LCP is as follows:
C-RNTI MAC CE or data from UL-CCCH;
Configured Grant Confirmation MAC CE or BFR MAC CE or Multiple Entry Configured Grant Confirmation MAC CE;
Sidelink Configured Grant Confirmation MAC CE;
LBT failure MAC CE;

MAC CE for SL-BSR prioritized according to the technical features related to Buffer Status Reporting, which are described above with reference to section 5.22.1.6 of 3GPP TS 38.321 v16.2.1;

MAC CE for BSR, with exception of BSR included for padding;

Single Entry PHR MAC CE or Multiple Entry PHR MAC CE;

MAC CE for the number of Desired Guard Symbols;

MAC CE for Pre-emptive BSR;

MAC CE for SL-BSR, with exception of (i) SL-BSR prioritized according to the technical features related to Buffer Status Reporting, which are described above with reference to section 5.22.1.6 of 3GPP TS 38.321 v16.2.1 and (ii) SL-BSR included for padding;

data from any Logical Channel, except data from UL-CCCH;

MAC CE for Recommended bit rate query;

MAC CE for BSR included for padding;

MAC CE for SL-BSR included for padding.

Therefore, according to the above order, if one of the following MAC CEs is included in a MAC PDU, UE prioritizes uplink transmission carrying the MAC PDU over sidelink transmission:

C-RNTI MAC CE;

Configured Grant Confirmation MAC CE or BFR MAC CE or Multiple Entry Configured Grant Confirmation MAC CE;

Sidelink Configured Grant Confirmation MAC CE;

LBT failure MAC CE;

MAC CE for SL-BSR prioritized according to the technical features related to Buffer Status Reporting, which are described above with reference to section 5.22.1.6 of 3GPP TS 38.321 v16.2.1;

MAC CE for BSR, with exception of BSR included for padding;

Single Entry PHR MAC CE or Multiple Entry PHR MAC CE;

MAC CE for the number of Desired Guard Symbols;

MAC CE for Pre-emptive BSR;

MAC CE for SL-BSR, with exception of (i) SL-BSR prioritized according to the technical features related to Buffer Status Reporting, which are described above with reference to section 5.22.1.6 of 3GPP TS 38.321 v16.2.1 and (ii) SL-BSR included for padding;

In step S1403, if BSR is triggered for requesting UL-SCH resource and no UL resource can accommodate the BSR, UE may trigger SR. Otherwise, if SL-BSR is triggered for requesting SL-SCH resource and no UL resource can accommodate the BSR, UE may trigger SR.

In step S1404, if both sl-Prioritizationthres and ul-Prioritizationthres are configured, the PUCCH resource for the SR transmission occasion does not overlap with an uplink grant received in a Random Access Response nor with the PUSCH duration of a MSGA payload, and the physical layer can signal the SR on one valid PUCCH resource for SR, the UE may perform one of the following actions for prioritization:

(i) If uplink transmission of the MAC PDU including the prioritized MAC CE collides with PUCCH transmission of the SR triggered for requesting SL-SCH resource, and if UE cannot simultaneously perform the uplink transmission of the MAC PDU and the PUCCH transmission of the SR, the UE may prioritize the uplink transmission of the MAC PDU including the prioritized MAC CE over the PUCCH transmission of the SR. Thus, the UE may drop the PUCCH transmission of the SR and perform the uplink transmission of the MAC PDU.

>Alternatively, even if the above conditions are met, in case the priority value of a sidelink logical channel that triggers the SR is lower than sl-Prioritizationthres, the UE may prioritize the PUCCH transmission of the SR over the uplink transmission of the MAC PDU. Thus, the UE may drop the uplink transmission of the MAC PDU and perform the PUCCH transmission of the SR.

(ii) If uplink transmission of the MAC PDU not including the prioritized MAC CE collides with PUCCH transmission of the SR triggered for requesting SL-SCH resource, and/or uplink transmission of the MAC PDU including non-prioritized MAC CE collides with PUCCH transmission of the SR triggered for requesting SL-SCH resource, the UE may prioritize the PUCCH transmission of the SR over the uplink transmission of the MAC PDU. Thus, the UE may drops the uplink transmission of the MAC PDU and perform the PUCCH transmission of the SR.

>Alternatively, even if the above conditions are met, in case that UL data from one or more logical channels is included in the MAC PDU and the priority value of the highest logical channels in the MAC PDU is lower than ul-Prioritizationthres, the UE may prioritize the uplink transmission of the MAC PDU over the PUCCH transmission of the SR. Thus, the UE may drop the PUCCH transmission of the SR and perform the uplink transmission of the MAC PDU.

>> So, in case that UL data from one or more logical channels is included in the MAC PDU and the priority value of the highest logical channels in the MAC PDU is higher than or equal to ul-Prioritizationthres, the UE prioritizes the PUCCH transmission over the uplink transmission. Thus, the UE drops the uplink transmission and performs the PUCCH transmission.

(iii) If uplink transmission of the MAC PDU including the prioritized MAC CE collides with PUCCH transmission of the SR triggered for requesting UL-SCH resource, and if UE cannot simultaneously perform the uplink transmission of the MAC PDU and the PUCCH transmission of the SR, the UE may prioritize the uplink transmission of the MAC PDU including the prioritized MAC CE over the PUCCH transmission of the SR. Thus, the UE may drop the PUCCH transmission of the SR and perform the uplink transmission of the MAC PDU.

>Alternatively, even if the above conditions are met, in case the priority value of a logical channel that triggers the SR is lower than ul-Prioritizationthres, the UE may prioritize the PUCCH transmission of the SR over the uplink transmission of the MAC PDU. Thus, the UE may drop the uplink transmission of the MAC PDU and perform the PUCCH transmission of the SR.

>>So, in case the priority value of a logical channel that triggers the SR is higher than or equal to ul-Prioritizationthres, the UE may prioritize the PUCCH transmission of the SR over the uplink transmission of the MAC PDU. Thus, the UE may drop the uplink transmission of the MAC PDU and performs the PUCCH transmission of the SR.

(iv) If uplink transmission of the MAC PDU not including the prioritized MAC CE collides with PUCCH transmission of the SR triggered for requesting UL-SCH resource, and/or uplink transmission of the MAC PDU including non-prioritized MAC CE collides with PUCCH transmission of the SR triggered for requesting UL-SCH resource, the UE may prioritize the PUCCH transmission of the SR over the uplink transmission of the MAC PDU. Thus, the UE may drop the uplink transmission of the MAC PDU and perform the PUCCH transmission of the SR.

>Alternatively, even if the above conditions are met, in case that UL data from one or more logical channels is included in the MAC PDU and the priority value of the highest logical channels in the MAC PDU is lower than ul-Prioritizationthres, the UE may prioritize the uplink transmission of the MAC PDU over the PUCCH transmission of the SR. Thus, the UE may drop the PUCCH transmission of the SR and perform the uplink transmission of the MAC PDU.

>>So, in case that UL data from one or more logical channels is included in the MAC PDU and the priority value of the highest logical channels in the MAC PDU is higher than or equal to ul-Prioritizationthres, the UE may prioritize the PUCCH transmission of the SR over the uplink transmission of the MAC PDU. Thus, the UE may drop the uplink transmission of the MAC PDU and perform the PUCCH transmission of the SR.

>Alternatively, even if the above conditions are met, in case that UL data from one or more logical channels is included in the MAC PDU and the priority value of the highest logical channels in the MAC PDU is lower than the priority value of the logical channel that triggered the SR, the UE may prioritize the uplink transmission of the MAC PDU over the PUCCH transmission of the SR. Thus, the UE may drop the PUCCH transmission of the SR and perform the uplink transmission of the MAC PDU.

>>So, in case that UL data from one or more logical channels is included in the MAC PDU and the priority value of the highest logical channels in the MAC PDU is higher than or equal to the priority value of the logical channel that triggered the SR, the UE may prioritize the PUCCH transmission of the SR over the uplink transmission of the MAC PDU. Thus, the UE may drop the uplink transmission of the MAC PDU and perform the PUCCH transmission of the SR.

In step S1405, after the PUCCH transmission, UE may monitor PDCCH with SL-RNTI or C-RNTI and receive SL grant or UL grant.

In step S1406, UE may perform PSCCH/PSSCH transmission based on the SL grant or PUSCH transmission based on the UL grant.

Some of the detailed steps shown in the example of FIGS. 12, 13, and 14 may not be essential steps and may be omitted. In addition, steps other than the steps shown in FIGS. 12, 13, and 14 may be added, and the order of the steps may vary. Some of the above steps may have their own technical meaning.

Hereinafter, Scheduling Request Procedure according to some embodiments of the present disclosure is described.

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery and for consistent LBT failure, at most one PUCCH resource for SR is configured per BWP.

Each SR configuration corresponds to one or more logical channels and/or to SCell beam failure recovery and/or to consistent LBT failure. Each logical channel, SCell beam failure recovery, and consistent LBT failure, may be mapped to zero or one SR configuration, which is configured by RRC. The SR configuration of the logical channel that triggered a BSR or the SCell beam failure recovery or the consistent LBT failure (if such a configuration exists) is considered as corresponding SR configuration for the triggered SR. Any SR configuration may be used for an SR triggered by Pre-emptive BSR.

RRC configures the following parameters for the scheduling request procedure:
  sr-ProhibitTimer (per SR configuration);
  sr-TransMax (per SR configuration).

The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

Except for SCell beam failure recovery, all pending SR(s) for BSR triggered according to the BSR procedure prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR prior to the MAC PDU assembly. Except for SCell beam failure recovery, all pending SR(s) for BSR triggered according to the BSR procedure shall be cancelled and each respective sr-ProhibitTimer shall be stopped when the UL grant(s) can accommodate all pending data available for transmission. All pending SR(s) for Pre-emptive BSR triggered according to the Pre-emptive BSR procedure prior to the MAC PDU assembly shall be cancelled and each respective sr-ProhibitTimer shall be stopped when a MAC PDU containing the relevant Pre-emptive BSR MAC CE is transmitted. Pending SR triggered for beam failure recovery of an SCell shall be cancelled and respective sr-ProhibitTimer shall be stopped when the MAC PDU is transmitted and this PDU includes a BFR MAC CE or Truncated BFR MAC CE which contains beam failure recovery information of that SCell. Pending SR triggered for beam failure recovery of an SCell shall be cancelled upon deactivation of that SCell.

The MAC entity shall for each pending SR triggered by consistent LBT failure for a Serving Cell:
  1> if a MAC PDU is transmitted and the MAC PDU includes an LBT failure MAC CE that indicates consistent LBT failure for the Serving Cell that triggered this SR; or
  1> if all the triggered consistent LBT failure(s) for that Serving Cell that triggered this SR are cancelled:
    2> cancel the pending SR and stop the corresponding sr-ProhibitTimer, if running.

Only PUCCH resources on a BWP which is active at the time of SR transmission occasion are considered valid.

As long as at least one SR is pending, the MAC entity shall for each pending SR:
  1> if the MAC entity has no valid PUCCH resource configured for the pending SR:
    2> initiate a Random Access procedure on the SpCell and cancel the pending SR.
  1> else, for the SR configuration corresponding to the pending SR:
    2> when the MAC entity has an SR transmission occasion on the valid PUCCH resource for SR configured; and
    2> if sr-ProhibitTimer is not running at the time of the SR transmission occasion; and
    2> if the PUCCH resource for the SR transmission occasion does not overlap with a measurement gap:
      3> if the PUCCH resource for the SR transmission occasion overlaps with neither a UL-SCH resource nor an SL-SCH resource; or 3> if the MAC entity is able to perform this SR transmission simultaneously with the transmission of the SL-SCH resource; or
3> if the PUCCH resource for the SR transmission occasion does not overlap with an uplink grant received in a Random Access Response nor with the PUSCH duration of a MSGA payload and the physical layer can signal the SR on one valid PUCCH resource for SR:
4> if the MAC entity is configured with lch-basedPrioritization, and the PUCCH resource for the SR transmission occasion for the pending SR triggered overlaps with any other UL-SCH resource(s), and the priority of the logical channel that triggered SR is higher than the priority of the uplink grant(s) for any UL-SCH resource(s) where the uplink grant was not already de-prioritized, and the priority of the uplink grant is determined; or
4> if both sl-Prioritizationthres and ul-Prioritizationthres are configured and the PUCCH resource for the SR transmission occasion for the pending SR triggered overlaps with any UL-SCH resource(s) carrying a MAC PDU, and the priority of the triggered SR determined is lower than sl-Prioritizationthres and the value of the highest priority of the logical channel(s) in the MAC PDU is higher than or equal to ul-Prioritizationthres and any MAC CE prioritized is not included in the MAC PDU and the MAC PDU is not prioritized by upper layer; or
4> if a SL-SCH resource overlaps with the PUCCH resource for the SR transmission occasion for the pending SR triggered, and the MAC entity is not able to perform this SR transmission simultaneously with the transmission of the SL-SCH resource, and either the transmission on the SL-SCH resource is not prioritized or the priority value of the logical channel that triggered SR is lower than ul-Prioritizationthres, if configured; or
4> if a SL-SCH resource overlaps with the PUCCH resource for the SR transmission occasion for the pending SR triggered, and the MAC entity is not able to perform this SR transmission simultaneously with the transmission of the SL-SCH resource, and the priority of the triggered SR determined is higher than the priority of the MAC PDU determined for the SL-SCH resource:
5> consider the SR transmission as a prioritized SR transmission.
5> consider the other overlapping uplink grant(s), if any, as a de-prioritized uplink grant(s);
5> if SR_COUNTER<sr-TransMax:
6> instruct the physical layer to signal the SR on one valid PUCCH resource for SR;
6> if LBT failure indication is not received from lower layers:
7> increment SR_COUNTER by 1;
7> start the sr-ProhibitTimer.
6> else if lbt-FailureRecoveryConfig is not configured:
7> increment SR_COUNTER by 1.
5> else:
6> notify RRC to release PUCCH for all Serving Cells;
6> notify RRC to release SRS for all Serving Cells;
6> clear any configured downlink assignments and uplink grants;
6> clear any PUSCH resources for semi-persistent CSI reporting;
6> initiate a Random Access procedure on the SpCell and cancel all pending SRs.

4> else:
5> consider the SR transmission as a de-prioritized SR transmission.

Except for SR for SCell beam failure recovery, the selection of which valid PUCCH resource for SR to signal SR on when the MAC entity has more than one overlapping valid PUCCH resource for the SR transmission occasion is left to UE implementation.

If more than one individual SR triggers an instruction from the MAC entity to the PHY layer to signal the SR on the same valid PUCCH resource, the SR_COUNTER for the relevant SR configuration is incremented only once.

When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

For a UE operating in a semi-static channel access mode, PUCCH resources overlapping with the idle time of a fixed frame period are not considered valid.

The MAC entity may stop, if any, ongoing Random Access procedure due to a pending SR for BSR and BFR which has no valid PUCCH resources configured, which was initiated by MAC entity prior to the MAC PDU assembly. The ongoing Random Access procedure due to a pending SR for BSR may be stopped when the MAC PDU is transmitted using a UL grant other than a UL grant provided by Random Access Response or a UL grant determined for the transmission of the MSGA payload, and this PDU includes a BSR MAC CE which contains buffer status up to (and including) the last event that triggered a BSR prior to the MAC PDU assembly, or when the UL grant(s) can accommodate all pending data available for transmission. The ongoing Random Access procedure due to a pending SR for BFR of an SCell may be stopped when the MAC PDU is transmitted using a UL grant other than a UL grant provided by Random Access Response or a UL grant determined for the transmission of the MSGA payload and this PDU contains a BFR MAC CE or Truncated BFR MAC CE which includes beam failure recovery information of that SCell. Upon deactivation of SCell configured with beam failure detection the ongoing Random Access procedure due to a pending SR for BFR may be stopped if all triggered BFRs for SCells are cancelled.

The MAC entity may stop, if any, ongoing Random Access procedure due to a pending SR for consistent LBT failure, which has no valid PUCCH resources configured, if:
    all the SCells that triggered consistent LBT failure are deactivated; or
    a MAC PDU is transmitted using a UL grant other than a UL grant provided by Random Access Response or a UL grant determined for the transmission of the MSGA payload, and this PDU includes an LBT failure MAC CE that indicates consistent LBT failure for all the SCells that triggered consistent LBT failure.

Hereinafter, sidelink process according to some embodiments of the present disclosure is described.

The Sidelink process is associated with a HARQ buffer.

New transmissions and retransmissions are performed on the resource indicated in the sidelink grant and with the MCS selected.

If the Sidelink process is configured to perform transmissions of multiple MAC PDUs with Sidelink resource allocation mode 2, the process maintains a counter SL_RE- SOURCE_RESELECTION_COUNTER. For other configurations of the Sidelink process, this counter is not available.

If the Sidelink HARQ Entity requests a new transmission, the Sidelink process shall:
1> store the MAC PDU in the associated HARQ buffer;
1> store the sidelink grant received from the Sidelink HARQ Entity;
1> generate a transmission as described below.

If the Sidelink HARQ Entity requests a retransmission, the Sidelink process shall:
1> store the sidelink grant received from the Sidelink HARQ Entity;
1> generate a transmission as described below.

To generate a transmission, the Sidelink process shall:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if HARQ feedback has been enabled the MAC PDU:
3> instruct the physical layer to monitor PSFCH for the transmission and perform PSFCH reception.
2> if sl-PUCCH-Config is configured by RRC for the stored sidelink grant:
3> determine transmission of an acknowledgement on the PUCCH.
1> if this transmission corresponds to the last transmission of the MAC PDU:
2> decrement SL_RESOURCE_RESELECTION_COUNTER by 1, if available.
1> if sl-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum; or
1> if a positive acknowledgement to a transmission of the MAC PDU has been received; or
1> if negative-only acknowledgement was enabled in the SCI and no negative acknowledgement was received for the most recent (re-)transmission of the MAC PDU:
2> flush the HARQ buffer of the associated Sidelink process.

The transmission of the MAC PDU is prioritized over uplink transmissions of the MAC entity or the other MAC entity if the following conditions are met:
1> if the MAC entity is not able to perform this sidelink transmission simultaneously with all uplink transmissions at the time of the transmission, and
1> if uplink transmission is not prioritized by upper layer; and
1> if sl-PrioritizationThres is configured and if the value of the highest priority of logical channel(s) or a MAC CE in the MAC PDU is lower than sl-PrioritizationThres.

If the MAC entity is not able to perform this sidelink transmission simultaneously with all uplink transmissions at the time of the transmission, and prioritization-related information is not available prior to the time of this sidelink transmission due to processing time restriction, it is up to UE implementation whether this sidelink transmission is performed.

Hereinafter, an apparatus for priority handling between a prioritized MAC CE and a SR for data in a wireless communication system, according to some embodiments of the present disclosure, will be described. Herein, the apparatus may be a wireless device (100 or 200) in FIGS. 2, 3, and 5.

For example, a wireless device may perform methods described in FIGS. 13 and 14. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to determine a prioritized Media Access Control (MAC) Control Element (MAC CE) which is prioritized over a data in Logical Channel Prioritization. The processor 102 may be configured to trigger Scheduling Request (SR) for requesting resource for the data. Based on that Physical Uplink Control Channel (PUCCH) transmission of the triggered SR is overlapped with uplink transmission of a first MAC PDU including the prioritized MAC CE, the processor 102 may be configured to prioritize the uplink transmission of the first MAC PDU over the PUCCH transmission of the triggered SR transmission, and perform the uplink transmission of the first MAC PDU.

For example, the data may be a sidelink (SL) data.

For example, the requesting resource for the data may be either an uplink (UL) resource or a sidelink resource.

For example, based on that PUCCH transmission of the triggered SR is overlapped with uplink transmission of a MAC PDU including the prioritized MAC CE, the processor 102 may be configured to drop the PUCCH transmission of the triggered SR transmission.

For example, the prioritized MAC CE may include at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

For example, the data may be from a logical channel except uplink-Common Control Channel (UL-CCCH).

According to some embodiments of the present disclosure, the processor 102 may be configured to determine a non-prioritized MAC CE, wherein the data is prioritized over the non-prioritized MAC CE.

In this case, based on that PUCCH transmission of the triggered SR is overlapped with uplink transmission of a second MAC PDU including the non-prioritized MAC CE, the processor 102 may be configured to prioritize the PUCCH transmission of the triggered SR transmission over the uplink transmission of the second MAC PDU, and perform the PUCCH transmission of the triggered SR transmission.

For example, the non-prioritized MAC CE may include at least one of (1) MAC CE for Recommended bit rate query, (2) MAC CE for BSR included for padding, and (3) MAC CE for SL-BSR included for padding.

According to some embodiments of the present disclosure, the processor 102 may be configured to trigger a random access procedure.

Based on that PUCCH transmission of the triggered SR is overlapped with an uplink resource for the random access procedure, the processor 102 may be configured to prioritize the uplink resource for the random access procedure over the PUCCH transmission of the triggered SR transmission, and perform the random access procedure using the uplink resource.

For example, the uplink resource for the random access procedure may include an uplink grant included in an Access Response message for the random access procedure.

For example, the uplink resource for the random access procedure may include a Physical Uplink Shared Channel (PUSCH) duration of a MSGA payload.

According to some embodiments of the present disclosure, the processor 102 may be configured to be in communication with at least one of a user equipment, a network, or an autonomous vehicle other than the wireless device.

Hereinafter, a processor for a wireless device for priority handling between a prioritized MAC CE and a SR for data in a wireless communication system, according to some embodiments of the present disclosure, will be described.

The processor may be configured to control the wireless device to determine a prioritized Media Access Control (MAC) Control Element (MAC CE) which is prioritized over a data in Logical Channel Prioritization. The processor may be configured to control the wireless device to trigger Scheduling Request (SR) for requesting resource for the data. Based on that Physical Uplink Control Channel (PUCCH) transmission of the triggered SR is overlapped with uplink transmission of a first MAC PDU including the prioritized MAC CE, the processor may be configured to control the wireless device to prioritize the uplink transmission of the first MAC PDU over the PUCCH transmission of the triggered SR transmission, and perform the uplink transmission of the first MAC PDU.

For example, the data may be a sidelink (SL) data.

For example, the requesting resource for the data may be either an uplink (UL) resource or a sidelink resource.

For example, based on that PUCCH transmission of the triggered SR is overlapped with uplink transmission of a MAC PDU including the prioritized MAC CE, the processor may be configured to control the wireless device to drop the PUCCH transmission of the triggered SR transmission.

For example, the prioritized MAC CE may include at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

For example, the data may be from a logical channel except uplink-Common Control Channel (UL-CCCH).

According to some embodiments of the present disclosure, the processor may be configured to control the wireless device to determine a non-prioritized MAC CE, wherein the data is prioritized over the non-prioritized MAC CE.

In this case, based on that PUCCH transmission of the triggered SR is overlapped with uplink transmission of a second MAC PDU including the non-prioritized MAC CE, the processor may be configured to control the wireless device to prioritize the PUCCH transmission of the triggered SR transmission over the uplink transmission of the second MAC PDU, and perform the PUCCH transmission of the triggered SR transmission.

For example, the non-prioritized MAC CE may include at least one of (1) MAC CE for Recommended bit rate query, (2) MAC CE for BSR included for padding, and (3) MAC CE for SL-BSR included for padding.

According to some embodiments of the present disclosure, the processor may be configured to control the wireless device to trigger a random access procedure.

Based on that PUCCH transmission of the triggered SR is overlapped with an uplink resource for the random access procedure, the processor may be configured to control the wireless device to prioritize the uplink resource for the random access procedure over the PUCCH transmission of the triggered SR transmission, and perform the random access procedure using the uplink resource.

For example, the uplink resource for the random access procedure may include an uplink grant included in an Access Response message for the random access procedure.

For example, the uplink resource for the random access procedure may include a Physical Uplink Shared Channel (PUSCH) duration of a MSGA payload.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for priority handling between a prioritized MAC CE and a SR for data in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to determine a prioritized Media Access Control (MAC) Control Element (MAC CE) which is prioritized over a data in Logical Channel Prioritization. The stored a plurality of instructions may cause the wireless device to trigger Scheduling Request (SR) for requesting resource for the data. Based on that Physical Uplink Control Channel (PUCCH) transmission of the triggered SR is overlapped with uplink transmission of a first MAC PDU including the prioritized MAC CE, the stored a plurality of instructions may cause the wireless device to prioritize the uplink transmission of the first MAC PDU over the PUCCH transmission of the triggered SR transmission, and perform the uplink transmission of the first MAC PDU.

For example, the data may be a sidelink (SL) data.

For example, the requesting resource for the data may be either an uplink (UL) resource or a sidelink resource.

For example, based on that PUCCH transmission of the triggered SR is overlapped with uplink transmission of a MAC PDU including the prioritized MAC CE, the stored a plurality of instructions may cause the wireless device to drop the PUCCH transmission of the triggered SR transmission.

For example, the prioritized MAC CE may include at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

For example, the data may be from a logical channel except uplink-Common Control Channel (UL-CCCH).

According to some embodiments of the present disclosure, the stored a plurality of instructions may cause the wireless device to determine a non-prioritized MAC CE, wherein the data is prioritized over the non-prioritized MAC CE.

In this case, based on that PUCCH transmission of the triggered SR is overlapped with uplink transmission of a second MAC PDU including the non-prioritized MAC CE, the stored a plurality of instructions may cause the wireless device to prioritize the PUCCH transmission of the triggered SR transmission over the uplink transmission of the second MAC PDU, and perform the PUCCH transmission of the triggered SR transmission.

For example, the non-prioritized MAC CE may include at least one of (1) MAC CE for Recommended bit rate query, (2) MAC CE for BSR included for padding, and (3) MAC CE for SL-BSR included for padding.

According to some embodiments of the present disclosure, the stored a plurality of instructions may cause the wireless device to trigger a random access procedure.

Based on that PUCCH transmission of the triggered SR is overlapped with an uplink resource for the random access procedure, the stored a plurality of instructions may cause the wireless device to prioritize the uplink resource for the random access procedure over the PUCCH transmission of the triggered SR transmission, and perform the random access procedure using the uplink resource.

For example, the uplink resource for the random access procedure may include an uplink grant included in an Access Response message for the random access procedure.

For example, the uplink resource for the random access procedure may include a Physical Uplink Shared Channel (PUSCH) duration of a MSGA payload.

According to some embodiments of the present disclosure, the stored a plurality of instructions may cause the wireless device to be in communication with at least one of a user equipment, a network, or an autonomous vehicle other than the wireless device.

The present disclosure can have various advantageous effects.

According to some embodiments of the present disclosure, a wireless device could efficiently handle the priority between an Uplink-Shared Channel (UL-SCH) and a for a Scheduling Request (SR) Physical Uplink Control Channel (PUCCH).

For example, a wireless device could prevent to drop a prioritized transmission between the UL-SCH and the SR PUCCH.

In particular, a wireless device could efficiently perform priority handling between UL transmission of the MAC PDU including prioritized MAC CE and SR transmission triggered for requesting UL-SCH resource or SL-SCH resource.

According to some embodiments of the present disclosure, a wireless communication system could efficiently support the priority handling between an Uplink-Shared Channel (UL-SCH) and a for a Scheduling Request (SR) Physical Uplink Control Channel (PUCCH).

For example, a wireless communication system could efficiently support prioritized transmission for a prioritized MAC CE over a SR transmission.

For example, priority between UL transmission of the MAC PDU including prioritized MAC CE and SR transmission triggered for requesting UL-SCH resource or SL-SCH resource could be clearly determined in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   prioritizing one or more Media Access Control (MAC) Control Elements (MAC CEs) over a data in Logical Channel Prioritization; and
   triggering Scheduling Request (SR) for requesting resource for the data;
   based on (1) Physical Uplink Control Channel (PUCCH) transmission of the triggered SR being overlapped with uplink transmission of a MAC protocol data unit (PDU) and (2) the one or more MAC CEs being not included in the MAC PDU:
   (1) considering the PUCCH transmission of the triggered SR as a prioritized SR transmission; and
   (2) performing the PUCCH transmission of the triggered SR,
   wherein the one or more MAC CE includes at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

2. The method of claim 1, wherein the data is a sidelink (SL) data.

3. The method of claim 1, wherein the requesting resource for the data is either an uplink (UL) resource or a sidelink resource.

4. The method of claim 1, wherein the method further comprises,
   based on (1) the PUCCH transmission of the triggered SR being overlapped with uplink transmission of the MAC PDU and (2) the one or more MAC CEs being not included in the MAC PDU:
   dropping the uplink transmission of the MAC PDU.

5. The method of claim 1, wherein the data is from a logical channel except uplink-Common Control Channel (UL-CCCH).

6. The method of claim 1, wherein the method further comprises,
   determining a non-prioritized MAC CE, wherein the data is prioritized over the non-prioritized MAC CE.

7. The method of claim 1, wherein the method further comprises,
   based on (1) the PUCCH transmission of the triggered SR being overlapped with uplink transmission of the MAC PDU and (2) at least one of the one or more MAC CEs being included in the MAC PDU:
   (1) considering the uplink transmission of the MAC PDU as a prioritized uplink transmission; and
   (2) performing the uplink transmission of the MAC PDU.

8. The method of claim 6, wherein the non-prioritized MAC CE includes at least one of (1) MAC CE for Recommended bit rate query, (2) MAC CE for BSR included for padding, and (3) MAC CE for SL-BSR included for padding.

9. The method of claim 6, wherein the method further comprises,
   triggering a random access procedure;
   based on the PUCCH transmission of the triggered SR being overlapped with an uplink resource for the random access procedure:
   (1) prioritizing the uplink resource for the random access procedure over the PUCCH transmission of the triggered SR transmission; and
   (2) performing the random access procedure using the uplink resource.

10. The method of claim 9, wherein the uplink resource for the random access procedure includes an uplink grant included in an Access Response message for the random access procedure.

11. The method of claim 9, wherein the uplink resource for the random access procedure includes a Physical Uplink Shared Channel (PUSCH) duration of a MSGA payload.

12. The method of claim 1, wherein the wireless device is in communication with at least one of a user equipment, a network, or an autonomous vehicle other than the wireless device.

13. A wireless device in a wireless communication system comprising:
   a transceiver;
   a memory; and
   at least one processor operatively coupled to the transceiver and the memory, and configured to:
   prioritize one or more Media Access Control (MAC) Control Elements (MAC CEs) over a data in Logical Channel Prioritization; and
   trigger Scheduling Request (SR) for requesting resource for the data;
   based on (1) Physical Uplink Control Channel (PUCCH) transmission of the triggered SR being overlapped with uplink transmission of a MAC protocol data unit (PDU) and (2) the one or more MAC CEs being not included in the MAC PDU:
   (1) consider the PUCCH transmission of the triggered SR as a prioritized SR transmission; and
   (2) perform the PUCCH transmission of the triggered SR,
   wherein the one or more MAC CE includes at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

14. The wireless device of claim 13, wherein the data is a sidelink (SL) data.

15. The wireless device of claim 13, wherein the requesting resource for the data is either an uplink (UL) resource or a sidelink resource.

16. The wireless device of claim 13, wherein the at least one processor is further configured to,
- based on (1) the PUCCH transmission of the triggered SR being overlapped with uplink transmission of the MAC PDU and (2) the one or more MAC CEs being not included in the MAC PDU:
  - drop the uplink transmission of the MAC PDU.

17. The wireless device of claim 13, wherein the data is from a logical channel except uplink-Common Control Channel (UL-CCCH).

18. The wireless device of claim 13, wherein the at least one processor is further configured to,
- determine a non-prioritized MAC CE, wherein the data is prioritized over the non-prioritized MAC CE.

19. The wireless device of claim 13, wherein the at least one processor is further configured to,
- based on (1) the PUCCH transmission of the triggered SR being overlapped with uplink transmission of the MAC PDU and (2) at least one of the one or more MAC CEs being included in the MAC PDU:
  - (1) consider the uplink transmission of the MAC PDU as a prioritized uplink transmission; and
  - (2) perform the uplink transmission of the MAC PDU.

20. A base station in a wireless communication system comprising:
- a transceiver;
- a memory; and
- a processor operatively coupled to the transceiver and the memory, and configured to:
- control the transceiver to transmit, to a wireless device, a radio resource control (RRC) reconfiguration including a Physical Uplink Control Channel (PUCCH) resources for Scheduling Request (SR);
- control the transceiver to perform transmission on a Physical Downlink Control Channel (PDCCH) with a Cell-Radio Network Temporary Identifier (C-RNTI); and
- control the transceiver to perform PUCCH reception of a SR triggered by the wireless device, based on (1) the PUCCH transmission of the SR of the wireless device being overlapped with uplink transmission of a MAC protocol data unit (PDU) of the wireless device and (2) one or more MAC CEs prioritized over a data in Logical Channel Prioritization of the wireless device being not included in the MAC PDU,
- wherein the one or more MAC CE includes at least one of (1) Cell-Radio Network Temporary Identifier (C-RNTI) MAC CE, (2) Configured Grant Confirmation MAC CE, (3) Beam Failure Recovery (BFR) MAC CE, (4) Multiple Entry Configured Grant Confirmation MAC CE, (5) Sidelink Configured Grant Confirmation MAC CE, (6) LBT failure MAC CE, (7) MAC CE for SL-Buffer Status Report (BSR), with exception of SL-BSR included for padding, (8) MAC CE for BSR, with exception of BSR included for padding, (9) Single Entry Power Headroom Report (PHR) MAC CE, (10) Multiple Entry PHR MAC CE, (11) MAC CE for the number of Desired Guard Symbols, and/or (12) MAC CE for Pre-emptive BSR.

\* \* \* \* \*